US012686504B2

(12) United States Patent
Warwick et al.

(10) Patent No.: US 12,686,504 B2
(45) Date of Patent: ***Jul. 21, 2026

(54) DRONE DELIVERY SYSTEM

(71) Applicant: Southeastern Pennsylvania Unmanned Aircraft Systems, LLC, Bensalem, PA (US)

(72) Inventors: Joseph W. Warwick, Bensalem, PA (US); Jason T. Erdreich, Randolph, NJ (US)

(73) Assignee: Southeastern Pennsylvania Unmanned Aircraft Systems, LLC, Bensalem, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/354,928

(22) Filed: Oct. 10, 2025

(65) Prior Publication Data

US 2026/0035091 A1      Feb. 5, 2026

Related U.S. Application Data

(63) Continuation of application No. 19/068,117, filed on Mar. 3, 2025, now Pat. No. 12,486,046, which is a
(Continued)

(51) Int. Cl.
*B64F 1/00* (2024.01)
*B64C 39/02* (2023.01)
(Continued)

(52) U.S. Cl.
CPC ............ *B64F 1/007* (2013.01); *B64C 39/024* (2013.01); *B64F 1/005* (2013.01); *B64U 10/14* (2023.01);
(Continued)

(58) Field of Classification Search
CPC ........ B64F 1/007; B64F 1/005; B64C 39/024; B64U 10/14; B64U 80/70; B64U 2101/30; B64U 2101/60
See application file for complete search history.

(56) References Cited

U.S. PATENT DOCUMENTS

| | | | |
|---|---|---|---|
| 8,511,606 B1* | 8/2013 | Lutke | B64U 80/40 |
| | | | 320/109 |
| 9,446,858 B2* | 9/2016 | Hess | B64F 3/02 |

(Continued)

*Primary Examiner* — Medhat Badawi
(74) *Attorney, Agent, or Firm* — Michael Crilly, Esquire

(57) ABSTRACT

A device and a method for introducing a drone to an area of interest are presented. The delivery system may include a housing, a drone, either a timer or a receiver, a lock mechanism, and a biasing mechanism. The housing further includes a pair of parts with or without subparts. At least one sensor is attached to the drone. The timer or the receiver is secured to the housing and communicable with the lock mechanism to control function thereof. The lock mechanism is adapted to releasably secure the parts or the subparts. The drone is enclosed within the housing in a CLOSED configuration when the lock mechanism is locked. The biasing mechanism separates the parts or the subparts to an OPEN configuration when the lock mechanism is unlocked. The drone is introducible to the area of interest in the CLOSED configuration and separable from the housing in the OPEN configuration.

20 Claims, 17 Drawing Sheets

Related U.S. Application Data continuation of application No. 18/631,222, filed on Apr. 10, 2024, now Pat. No. 12,291,352, which is a continuation of application No. 18/363,048, filed on Aug. 1, 2023, now Pat. No. 12,012,225, which is a continuation of application No. 15/734,271, filed as application No. PCT/US2020/016008 on Jan. 31, 2020, now Pat. No. 11,767,129.

(51) Int. Cl.

| | |
|---|---|
| B64U 10/14 | (2023.01) |
| B64U 80/70 | (2023.01) |
| B64U 101/30 | (2023.01) |
| B64U 101/60 | (2023.01) |

(52) U.S. Cl.
CPC .......... *B64U 80/70* (2023.01); *B64U 2101/30* (2023.01); *B64U 2101/60* (2023.01)

(56) References Cited

U.S. PATENT DOCUMENTS

| | | | | |
|---|---|---|---|---|
| 9,650,134 | B2 * | 5/2017 | Chappell | B60Q 5/00 |
| 9,718,564 | B1 * | 8/2017 | Beckman | B61L 15/0027 |
| 9,880,563 | B2 * | 1/2018 | Fisher | B64F 1/005 |
| 10,053,217 | B2 * | 8/2018 | Cho | B64F 1/222 |
| 10,091,418 | B2 * | 10/2018 | Alvarado-Moya | G06T 3/4038 |
| 10,168,701 | B2 * | 1/2019 | Berberian | A63H 30/04 |
| 10,252,799 | B2 * | 4/2019 | Mottale | B64C 39/08 |
| 10,467,685 | B1 * | 11/2019 | Brisson | G06Q 10/083 |
| 10,526,094 | B2 * | 1/2020 | Cheng | B64U 80/25 |
| D903,576 | S * | 12/2020 | Feldman | D12/345 |
| 11,106,224 | B2 * | 8/2021 | Wang | B64U 70/20 |
| 11,148,805 | B2 * | 10/2021 | Cooper | B64U 70/97 |
| 11,279,481 | B2 * | 3/2022 | Burks | H04W 4/44 |
| 11,597,515 | B2 * | 3/2023 | Passley | B64F 1/007 |
| 11,603,218 | B2 * | 3/2023 | Fisher | B64F 1/222 |
| 12,059,089 | B1 * | 8/2024 | Dunn | A47G 29/141 |
| 2012/0080556 | A1 * | 4/2012 | Root, Jr. | B64F 1/06 |
| | | | | 73/170.28 |
| 2013/0233964 | A1 * | 9/2013 | Woodworth | B64U 10/60 |
| | | | | 244/175 |
| 2014/0124621 | A1 * | 5/2014 | Godzdanker | B64F 1/125 |
| | | | | 244/110 E |
| 2015/0191246 | A1 * | 7/2015 | Kalantari | B64U 10/14 |
| | | | | 244/2 |
| 2016/0107750 | A1 * | 4/2016 | Yates | B64U 10/25 |
| | | | | 244/2 |
| 2016/0137293 | A1 * | 5/2016 | Santangelo | B64C 25/32 |
| | | | | 244/50 |
| 2016/0196756 | A1 * | 7/2016 | Prakash | B64U 80/25 |
| | | | | 701/3 |
| 2016/0200415 | A1 * | 7/2016 | Cooper | A63H 27/12 |
| | | | | 244/17.15 |
| 2016/0229299 | A1 * | 8/2016 | Streett | B60L 53/12 |
| 2016/0272317 | A1 * | 9/2016 | Cho | B64F 1/222 |
| 2017/0021941 | A1 * | 1/2017 | Fisher | G05D 1/0011 |
| 2017/0021942 | A1 * | 1/2017 | Fisher | B64U 70/80 |
| 2017/0023949 | A1 * | 1/2017 | Fisher | G08G 5/55 |
| 2017/0038780 | A1 * | 2/2017 | Fandetti | G06Q 10/083 |
| 2017/0073085 | A1 * | 3/2017 | Tremblay | B64F 1/007 |
| 2017/0101017 | A1 * | 4/2017 | Streett | B60L 53/12 |
| 2017/0113815 | A1 * | 4/2017 | James | B64F 1/222 |
| 2017/0129464 | A1 * | 5/2017 | Wang | B60L 53/80 |
| 2017/0144776 | A1 * | 5/2017 | Fisher | B64C 39/024 |
| 2017/0158353 | A1 * | 6/2017 | Schmick | B60L 53/12 |
| 2017/0190443 | A1 * | 7/2017 | Fisher | B64F 1/005 |
| 2017/0203857 | A1 * | 7/2017 | O'Toole | B64F 1/32 |
| 2017/0225799 | A1 * | 8/2017 | Selwyn | B64F 1/005 |
| 2017/0225802 | A1 * | 8/2017 | Lussier | B64F 1/007 |
| 2017/0253349 | A1 * | 9/2017 | Wang | B64U 70/97 |
| 2018/0059660 | A1 * | 3/2018 | Heatzig | G06V 20/10 |
| 2018/0220826 | A1 * | 8/2018 | Sillings | A47G 29/1225 |
| 2018/0233009 | A1 * | 8/2018 | Spector | G05D 1/12 |
| 2019/0177005 | A1 * | 6/2019 | Kim | B64U 50/38 |
| 2019/0308724 | A1 * | 10/2019 | Cooper | B64U 80/25 |
| 2020/0189731 | A1 * | 6/2020 | Mistry | B64C 39/022 |
| 2020/0225684 | A1 * | 7/2020 | Anderson | B64U 70/95 |
| 2021/0237899 | A1 * | 8/2021 | Warwick | B64F 1/007 |
| 2021/0279678 | A1 * | 9/2021 | Ur | G06Q 10/08355 |
| 2023/0192291 | A1 * | 6/2023 | Svolos | G05D 1/102 |
| | | | | 701/3 |
| 2023/0382557 | A1 * | 11/2023 | Warwick | B64F 1/007 |
| 2024/0239525 | A1 * | 7/2024 | Passley | B64U 20/50 |
| 2024/0253820 | A1 * | 8/2024 | Warwick | B64F 1/007 |
| 2025/0242942 | A1 * | 7/2025 | Warwick | B64F 1/007 |
| 2026/0035091 | A1 * | 2/2026 | Warwick | B64F 1/007 |

* cited by examiner

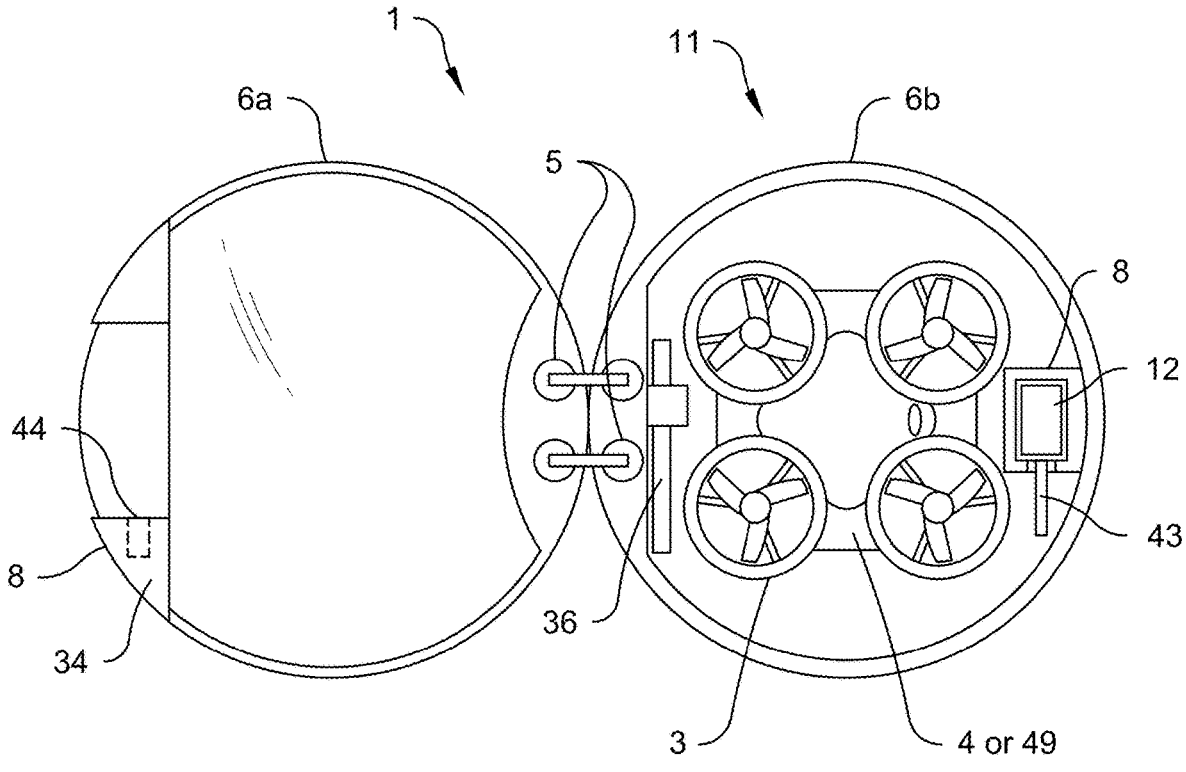
_Fig. 16_

DRONE DELIVERY SYSTEM

REFERENCE TO RELATED APPLICATIONS

This application is a continuation of U.S. patent application Ser. No. 19/068,117 filed Mar. 3, 2025 which is a continuation of U.S. patent application Ser. No. 18/631,222 filed Apr. 10, 2024 now U.S. Pat. No. 12,291,352 issued May 6, 2025 which is a continuation of U.S. patent application Ser. No. 18/363,048 filed Aug. 1, 2023 now U.S. Pat. No. 12,012,225 issued Jun. 18, 2024 which is a continuation of U.S. patent application Ser. No. 15/734,271 filed Dec. 2, 2020 now U.S. Pat. No. 11,767,129 issued Sep. 26, 2023 which is a National Phase of PCT Application No. PCT/US2020/016008 filed Jan. 31, 2020, all entitled Drone Delivery System, whereby all applications are incorporated in their entirety herein by reference thereto.

FEDERALLY SPONSORED RESEARCH AND DEVELOPMENT

None.

FIELD OF THE INVENTION

The disclosure generally relates to a device applicable to remote surveillance and more particularly is concerned, for example, with a protective housing with a drone therein and a method of use for the same. Specifically, the disclosure enables a drone to be introduced to an area of interest at a distance from a user without damage to the drone whereby the drone is separable from the housing and operable within the area of interest.

BACKGROUND OF THE INVENTION

Drones are particularly suitable to a variety of police, military, and civilian applications. In one example, a drone may permit a user, sometimes referred to as or including an operator or a pilot, to observe activities within an area of interest during a hostage event. In another example, a drone may permit a user to assess conditions or hazards within an area of interest after a manmade event, such as an industrial accident, or a natural event, such as a storm. In yet another example, a drone may permit a user to determine location and condition of persons trapped within an area of interest after an earthquake or a building collapse. In all such applications, the benefits derived from use of a drone depend on the performance of the drone, the skills of the user, and whether it is possible to introduce a drone into an area of interest.

The performance of a drone, such as mobility time and data acquisition, is limited by the operational life afforded by the power supply for the drone. The power supply is often depleted as a drone traverses the distance between a user and an area of interest thereby reducing mobility time and data acquisition within the area of interest. The related arts do not provide a delivery means which minimizes power use by a drone before entering an area of interest so as to maximize mobility time and data acquisition within the area of interest.

The skills of a drone user specific to mobility control vary widely depending on both training by and proficiency of the user. In many applications, the user, often under stressful conditions, must communicate, and sometimes anticipate the need for, difficult and complex maneuvers by a drone as it travels to an area of interest. While training is beneficial to user proficiency, it is impossible to train for all real-world scenarios and virtually impossible to eliminate all real-world user errors. The related arts do not provide a delivery means which minimizes user-specific factors before entering an area of interest so as to maximize the likelihood that a drone successfully reaches the area of interest.

In some other applications, an obstacle, either manmade (such as a window or a wall) or natural (such as a tree or a shrub), between a user and an area of interest may frustrate the successful introduction of a drone into the area of interest. The related arts do not provide a delivery means which enables a user to successfully introduce a drone, without damage thereto, to an area of interest beyond an obstacle or other hazard.

Accordingly, what is required is a delivery system which enables a user to introduce a drone to an area of interest without damage to the drone and which then enables the drone to separate from the delivery system and to operate within the area of interest.

SUMMARY OF THE INVENTION

An object of the disclosure is a delivery system which enables a user to introduce a drone to an area of interest without damage to the drone and which then enables the drone to separate from the delivery system and to operate within the area of interest.

In accordance with embodiments of a drone delivery system, the system includes a housing, a drone, a lock mechanism, and a biasing mechanism. The housing includes a pair of parts wherein one part further includes two subparts. Each subpart is attached to the other part. The drone has at least one sensor. The lock mechanism is adapted to secure one subpart to the other subpart when the lock mechanism is locked. The biasing mechanism moves the subparts with respect to the other part after the lock mechanism is unlocked. The drone is surrounded by the housing in a CLOSED configuration when the lock mechanism is locked. The drone is introducible to an area of interest in the CLOSED configuration. The drone is not surrounded by the housing in an OPEN configuration when the lock mechanism is unlocked. The drone is separable from the housing in the OPEN configuration.

In accordance with other embodiments of a drone delivery system, a timer is secured to one of the pair of parts and communicable with the lock mechanism to unlock the lock mechanism.

In accordance with other embodiments of a drone delivery system, a receiver is secured to one of the pair of parts and communicable with the lock mechanism to unlock the lock mechanism.

In accordance with other embodiments of a drone delivery system, each part is hemispherical shaped and the housing is spherical shaped when the parts are disposed in the CLOSED configuration.

In accordance with other embodiments of a drone delivery system, one part is hemispherical shaped and the other part is hemispherical shaped except for a contact surface In accordance with other embodiments of a drone delivery system, the subpart of one part is hingedly attached to the other part via a leaf rotatably secured to each of the subpart and the part.

In accordance with other embodiments of a drone delivery system, the subparts of one part is adapted to orient an open end of the other part with respect to a surface when the housing is reconfigured from the CLOSED configuration to the OPEN configuration.

In accordance with other embodiments of a drone delivery system, the drone is separable from the housing via flight.

In accordance with other embodiments of a drone delivery system, the sensor receives one of sound, image, video, sample, temperature, pressure, voltage, current, or radiation.

In accordance with other embodiments of a drone delivery system, the sensor is a camera.

In accordance with other embodiments of a drone delivery system, the camera is aligned with a port through the housing.

In accordance with other embodiments of a drone delivery system, the lock mechanism includes a pin along one subpart movable with respect to a slot along the other subpart wherein the lock mechanism is unlocked when the pin is not disposed within the slot and the lock mechanism is locked when the pin is disposed within the slot.

In accordance with other embodiments of a drone delivery system, the lock mechanism includes a solenoid along one subpart which lockingly engages the other subpart.

In accordance with other embodiments of a drone delivery system, the lock mechanism includes a servo motor along one subpart which lockingly engages the other subpart.

In accordance with other embodiments of a drone delivery system, the biasing mechanism includes a biasing element and the subpart is movable via the biasing element. The biasing element at one end is fixed to the subpart and at another end is slidably disposed within a channel through the other part. The biasing element is curvedly disposed along the housing in the CLOSED configuration.

In accordance with other embodiments of a drone delivery system, one of the pair of parts includes a well with a ballast therein.

In accordance with other embodiments of a drone delivery system, the drone is secured to one of the pair of parts via a tether.

In accordance with other embodiments of a drone delivery system, one of power or
command is communicated to the drone via the tether.

In accordance with other embodiments of a drone delivery system, data is communicated from the drone via the tether.

In accordance with other embodiments of a drone delivery system, the housing includes at least one protrusion outwardly extending therefrom.

In accordance with other embodiments of a drone delivery system, at least one of the pair of parts includes a covering.

In accordance with other embodiments of a drone delivery system, the covering mitigates shock.

In accordance with other embodiments of a drone delivery system, the covering mitigates noise caused by impact between the housing and a surface.

In accordance with other embodiments of a drone delivery system, a plurality of arms is releasably secured to a housing in the CLOSED configuration and the arms are adapted to orient the housing along a surface in the OPEN configuration.

In accordance with other embodiments of a drone delivery system, the housing includes a port.

In accordance with other embodiments of a drone delivery system, the port vents air moved by a fan.

In accordance with other embodiments of a drone delivery system, the fan is attached to the drone.

In accordance with other embodiments of a drone delivery system, the housing is coded to indicate functional capability of the drone delivery system.

In accordance with other embodiments of a drone delivery system, the housing is coded to identify the drone delivery system for synchronization with a controller.

In accordance with yet other embodiments of a drone delivery system, the delivery system includes a housing, a drone, a lock mechanism, and a biasing mechanism. The housing includes a pair of parts with one part hingedly attached to the other part. The drone has at least one sensor. The lock mechanism is attached to the parts. The lock mechanism secures one part to the other part when the lock mechanism is locked. The biasing mechanism moves one part with respect to the other part after the lock mechanism is unlocked. The drone is surrounded by the housing in a CLOSED configuration when the lock mechanism is locked. The drone is introducible to an area of interest in the CLOSED configuration. The drone is not surrounded by the housing in an OPEN configuration when the lock mechanism is unlocked. The drone is separable from the housing in the OPEN configuration.

In accordance with yet other embodiments of a drone delivery system, a timer is secured to one of the pair of parts and communicable with the lock mechanism to unlock the lock mechanism.

In accordance with yet other embodiments of a drone delivery system, a receiver is secured to one of the pair of parts and communicable with the lock mechanism to unlock the lock mechanism.

In accordance with method embodiments for a drone delivery system, the method includes the steps of accelerating a housing including a pair of parts disposed about a drone with one part including two subparts, actuating a lock mechanism to release one subpart from another subpart, separating one subpart of the housing from another subpart of the housing, moving the drone from the housing, and obtaining data from a sensor attached to the drone.

In accordance with other method embodiments for a drone delivery system, the accelerating step includes launching the housing.

In accordance with other method embodiments for a drone delivery system, the accelerating step includes throwing the housing.

In accordance with other method embodiments for a drone delivery system, the accelerating step includes rolling the housing along a surface.

In accordance with other method embodiments for a drone delivery system, the actuating step is implemented by a timer wherein the timer is electrically communicable with the lock mechanism.

In accordance with other method embodiments for a drone delivery system, the actuating step is performed after a delay implemented by the timer.

In accordance with other method embodiments for a drone delivery system, the delay is initiated by electrically attaching a power supply to the timer.

In accordance with other method embodiments for a drone delivery system, the delay is initiated by a switch which controls power from a power supply to the timer.

In accordance with other method embodiments for a drone delivery system, the actuating step is implemented by a controller.

In accordance with other method embodiments for a drone delivery system, the actuating step is implemented by a receiver electrically communicable with the lock mechanism.

In accordance with other method embodiments for a drone delivery system, the receiver is communicable with a controller.

In accordance with other method embodiments for a drone delivery system, the separating step is implemented by a biasing mechanism.

In accordance with other method embodiments for a drone delivery system, the separating step includes moving one subpart away from the other subpart.

In accordance with other method embodiments for a drone delivery system, the separating step includes rotating one subpart away from the other part at a hinge mechanism attached to the subpart and the other part.

In accordance with other method embodiments for a drone delivery system, the moving step includes flying the drone.

In accordance with other method embodiments for a drone delivery system, the moving step includes moving the drone along a surface.

In accordance with other method embodiments for a drone delivery system, the moving step is implemented by a controller.

In accordance with other method embodiments for a drone delivery system, the obtaining step includes acquiring one of sound, image, video, sample, temperature, pressure, voltage, current, or radiation.

In accordance with other method embodiments for a drone delivery system, the obtaining step is implemented by a controller.

In accordance with other method embodiments for a drone delivery system, the data in the obtaining step may be received directly from the drone.

In accordance with other method embodiments for a drone delivery system, the data in the obtaining step may be received indirectly from the drone by way of the housing.

In accordance with yet method embodiments for a drone delivery system, the method includes the steps of accelerating a housing including a pair of parts disposed about a drone, actuating a lock mechanism to release one part from the other part, separating one part of the housing from the other part of the housing via a biasing mechanism, moving the drone from the housing, and obtaining data from a sensor attached to the drone.

In accordance with yet other method embodiments for a drone delivery system, the actuating step is implemented by a timer wherein the timer is electrically communicable with the lock mechanism.

In accordance with yet other method embodiments for a drone delivery system, the actuating step is performed after a delay is implemented by the timer.

In accordance with yet other method embodiments for a drone delivery system, the delay is initiated by electrically attaching a power supply to the timer.

In accordance with yet other method embodiments for a drone delivery system, the delay is initiated by a switch which controls power from a power supply to the timer.

In accordance with yet other method embodiments for a drone delivery system, the actuating step is implemented via a controller.

In accordance with yet other method embodiments for a drone delivery system, the actuating step is implemented by a receiver electrically communicable with the lock mechanism.

In accordance with yet other method embodiments for a drone delivery system, the receiver is communicable with a controller.

The delivery system may be introducible to, that is deliverable either near or into, an area of interest, non-limiting examples of the latter being a house, a building, a room, or a field. The delivery system may be introduced to the area of interest via rolling, throwing, launching, or other suitable forms. Regardless of the delivery approach, the delivery system is understood to be directed toward the area of interest. The delivery system is adapted to open after it is near or in an area of interest so as to deploy a surveillance device, namely, a drone, which may be operable wirelessly from a distance. Example drones include, but are not limited to, a mini UAV (unmanned aerial vehicle) with or without a tether. The drone may include a sensing element(s) which acquires data including but not limited to image, sound, sample (gas, liquid, or solid), temperature, pressure, voltage, current and/or radiation. The drone could include a video camera with one or more capabilities such as daylight vision, low-light vision, non-visible light vision, night vision, active infrared (IR), passive infrared (IR), active detection means, passive detection means, radar, or forward-looking infrared radar (FLIR). The camera may communicate a live feed to a user/operator located at a safe distance from the delivery system. In some applications, the delivery system and/or the drone may operate outside of the line-of-sight of the operator.

The delivery system may include a housing, a timer or a receiver, a lock mechanism, a drone, and a biasing mechanism. One or more components may be powered via a power supply, one non-limiting example being a battery.

The housing may include a first part and a second part fabricated from plastic, metal, and/or other suitable material (s) which is/are impact resistant and sufficiently capable of protecting the drone, the timer or the receiver, the lock mechanism, and the biasing mechanism from damage induced by the introduction means. In some embodiments, the housing may be rigid or flexible in part or whole. In other embodiments, each of the first part and the second part is hemispherical shaped to form a sphere in a CLOSED configuration which is adaptable to an OPEN configuration. The parts may be attached via a hinge or the like to permit reconfiguration from the CLOSED configuration to the OPEN configuration. In yet other embodiments, one part may include at least two subparts which are hingedly attached to the other part. The subparts may permit reconfiguration from the CLOSED configuration to the OPEN configuration after the delivery system is located near or within an area of interest. In some embodiments, the parts and/or the subparts may be completely separable so as to neither directly nor indirectly contact in the OPEN configuration. One part may be weighted to allow the delivery system to assume a preferred orientation with respect to a surface. The weighted part may also include a contact surface, preferably planar in part or whole, which contacts a surface when the delivery system is in a rest position and which stabilizes the delivery system prior to the OPEN configuration. It might be advantageous to illuminate the housing or an area about the housing. Illumination may be performed by a light on a camera-type sensor or a light attached to the housing.

The timer is secured to the housing, preferably within the housing. The timer may be activated when electrically attached to a power source, such as a battery, or via a mechanical switch, an electronic switch, a remote switch, or other suitable means. In preferred embodiments, the timer delays reconfiguration of the housing from CLOSED to OPEN configurations to permit introduction of the delivery system to an area of interest. In one non-limiting example, the timer may provide a predetermined time window or delay which allows the delivery system to be rolled, thrown, or launched to the area of interest in the CLOSED configuration before reconfiguration to the OPEN configuration and separation of the drone from the housing. The timer may be any suitable electronic device or mechanical device, a non-limiting example of the latter being a timer from a music box, capable of delaying a function of the delivery system, such as operation of the lock mechanism, and capable of initiating function of the lock mechanism, such as by communicating power or a command to the lock mechanism. In some embodiments, a receiver rather than a timer may be preferable to provide direct control of the opening functionality to the operator.

The lock mechanism is secured to the housing, preferably within the housing. The lock mechanism at least in part releasably secures one part to the other part or one subpart to the other subpart in the CLOSED configuration. The lock mechanism may be an electro-mechanical latch mechanism, a mechanical-servo release, or other device suitable to maintain the CLOSED configuration yet permit the OPEN configuration when appropriate. In preferred embodiments, the lock mechanism is communicable with the timer whereby the lock mechanism is activated by the timer at the end of a predetermined period so as to then to permit reconfiguration to the OPEN configuration. In the OPEN configuration, the drone is no longer surrounded by housing and the drone is deployable from the housing. The timer may communicate with the lock mechanism via either wire or wireless means.

The biasing mechanism enables separation between the parts, the subparts, or subpart(s) and a part. In some embodiments, the biasing mechanism may be a mechanical device with spring or spring-like functionality which enables separation of two or more components forming the housing about a drone. In other embodiments, the biasing mechanism may be a gas charge or other element capable of moving a part or subpart of the housing with respect to other components of the housing. In yet other embodiments, the biasing mechanism may be motorized or the like. In still other embodiments, the biasing mechanism may be coupled to or a part of the lock mechanism. In still yet other embodiments, the biasing mechanism may be adjacent to the lock mechanism. Regardless, the biasing mechanism is understood to facilitate reconfiguration of a housing from CLOSED to OPEN so that a drone initially secured within the housing in the CLOSED configuration is then separable from the housing in the OPEN configuration.

The drone is releasably secured within the housing, preferably to one of the two parts, and separable therefrom. The drone may be a remotely-operable device or an autonomous device which moves via flight or along a surface, receives information, and communicates information to another device. In preferred embodiments, the drone is small, lightweight, low cost, and expendable.

Other embodiments of the disclosure may include other optional features by way of the following non-limiting examples. In some embodiments, the housing may be shaped to include protrusions which facilitate penetration through a barrier material, examples including but not limited to glass, plywood, or drywall. In other embodiments, the housing may include protrusions, such as a carbide-tipped spike attached to the housing, which enhance penetration through a barrier material. In yet other embodiments, the exterior of the housing may include a design, an external covering (one non-limiting example being rubber), and/or a shape which protect(s) the delivery system from shock and/or damage, or which reduce(s) noise after impact, or which facilitate(s) orientation of the delivery system in a preferred direction to permit separation of the housing parts and movement by the drone. In still other embodiments, a drone may be tethered to one part of the housing so that the drone is movable to the extent permitted by the tether. The tether may or may not facilitate communication of power, command(s), and/or data to and/or from the drone. In other embodiments, the delivery system may include a vent for passive cooling or for active cooling by a fan so as to prevent heat buildup within the housing. In yet still other embodiments, the housing may include a port which is aligned with a sensor along the drone to allow the sensor to obtain information adjacent to the delivery system in the event of a failure by the delivery system or a condition which prevents the housing to open or which prevents separation of the drone. A camera-type sensor may include a wide-angle lens which maximizes the field of view through the port. In still other embodiments, the housing may include spring-like or moveable arms, a non-limiting example being resilient elements, which are releasable from the housing so as to properly orient the housing with respect to a surface. And in some yet other embodiments, it may be advantageous to visually code the housing to indicate functional capabilities and/or to permit synchronization with control hardware.

Several advantages are offered by one or more embodiments of the disclosure. The disclosure facilitates delivery of a drone from one location to another location while either minimizing or eliminating the distance traveled by the drone separate from the delivery system and prior to entering an area of interest. The disclosure conserves the power available for operation of a drone within an area of interest. The disclosure reduces the skills required of a drone operator by minimizing obstacles and hazards likely to be encountered before a drone enters an area of interest. The disclosure is suitable for use with a variety of situations which are hostile because of a person, a location, a condition, a material, an event, or other cause.

The above and other objectives, features, and advantages of the present disclosure will become better understood from the following description, appended claims, and accompanying drawings, in which like reference numerals designate the same or similar elements.

BRIEF DESCRIPTION OF THE DRAWINGS

Additional aspects, features, and advantages of the disclosure will be understood and will become more readily apparent when the disclosure is considered in light of the following description made in conjunction with the accompanying drawings.

FIG. 16 is a top view illustrating a drone delivery system with a single-piece upper part and a lower part wherein the upper part is hingedly attached to the lower part in accordance with an embodiment of the disclosure.

DETAILED DESCRIPTION

Figure 1:
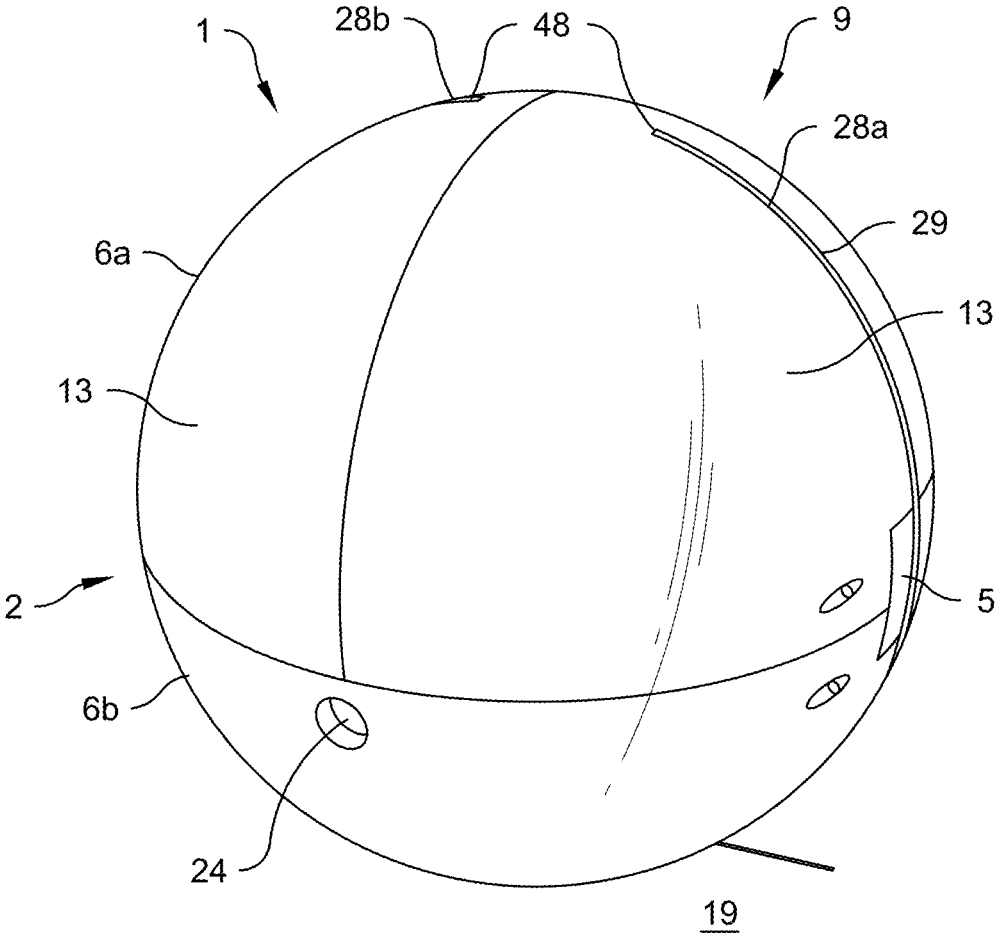
FIG. 1 is a perspective view illustrating a drone delivery system with optional port in a CLOSED configuration wherein a drone (not shown) is disposed within a housing including a pair of parts arranged so that one part includes two optional subparts which are movable with respect to the other part to form an OPEN configuration in accordance with an embodiment of the disclosure.

Reference will now be made in detail to several embodiments of the disclosure that are illustrated in the accompanying drawings. Wherever possible, same or similar reference numerals are used in the drawings and the description to refer to the same or like parts.

While features of various embodiments are separately described herein, it is understood that such features may be combinable to form other additional embodiments.

One or more components described herein may be manufactured via methods, processes, and techniques understood in the art, including, but not limited to, machining, molding, forming, and three-dimensional printing.

The drawing figures are not necessarily drawn to scale, but instead are drawn to provide a better understanding of the components thereof, and are not intended to be limiting in scope, but to provide exemplary illustrations.

The drone delivery system 1 includes a housing 2 which is configurable from a CLOSED configuration 9, such as illustrated by way of the non-limiting examples in FIGS. 1-4, to an OPEN configuration 11, such as illustrated by way of the non-limiting examples in FIGS. 5, 10-12, and 16.

Referring now to FIG. 1, the housing 2 is arranged in the CLOSED configuration 9 so as to provide a protective outer shell-like structure about components (not shown) disposed within a cavity formed by the housing 2. In its simplest form, the housing 2 includes a pair of separable parts 6 wherein one part is an upper part 6*a* and another part is a lower part 6*b*. The lower part 6*b* is distinguishable from the upper part 6*a* in that the lower part 6*b* is preferred to contact a surface 19 so as to permit movement of a drone from the housing 2. Either the upper part 6*a* or the lower part 6*b* may include an optional port 24, the latter illustrated in FIGS. 1 and 2, which permits either a sensor within the housing 2 to gather information in the CLOSED configuration 9 or which permits heat to vent from the housing 2 in the CLOSED configuration 9.

Referring again to FIG. 1, the parts 6*a*, 6*b* may have any shape suitable for and compatible with the delivery approach employed to introduce the drone delivery system 1 to an area of interest. The drone delivery system 1 may be delivered via various forms, including but not limited to launching, throwing, or rolling. Launching may include any suitable forms for accelerating the drone delivery system 1 from a device, non-limiting examples of the latter including either a launcher or a gun-like device, via mechanical means such as a spring or a spring-like mechanism or the like, via propellant means such as a combustible solid, liquid or gas or the like, via non-propellent means such as a compressed gas or a pressurized liquid or the like, or via other suitable forms. Throwing and rolling may include a user accelerating the drone delivery system 1 directly by hand, indirectly via a sling or projecting device, or any other suitable means whereby the user expends energy to accelerate the drone. In preferred embodiments, it may be advantageous for the parts 6a, 6b to allow the drone delivery system 1 to roll along a surface 19 in the CLOSED configuration 9 regardless of the delivery mode. By way of one non-limiting example, each part 6a, 6b may be hemispherical shaped so as to form a spherical shaped housing 2 in the CLOSED configuration 9 to permit roll functionality. In another non-limiting example, each part 6a, 6b may include planar surfaces which in combination approximate a generally spherical shape in the CLOSED configuration 9. Other roll-enabling shapes are possible.

Referring again to FIG. 1, one part 6 in some embodiments may include two or more parts 6 referred to as subparts 13. FIG. 1 illustrates a non-limiting example wherein the upper part 6a includes two separable subparts 13. The subparts 13 of the upper part 6a may in combination form a hemispherical shape when arranged with the lower part 6b in the CLOSED configuration 9 so that the subparts 13 and the lower part 6b form a spherical shaped housing 2. It is understood that other shapes similar to or functionally equivalent to hemispherical and spherical may permit roll functionality in the CLOSED configuration 9. In some embodiments, the parts 6a, 6b and/or subparts 13 may differ in shape and size.

Figure 3:
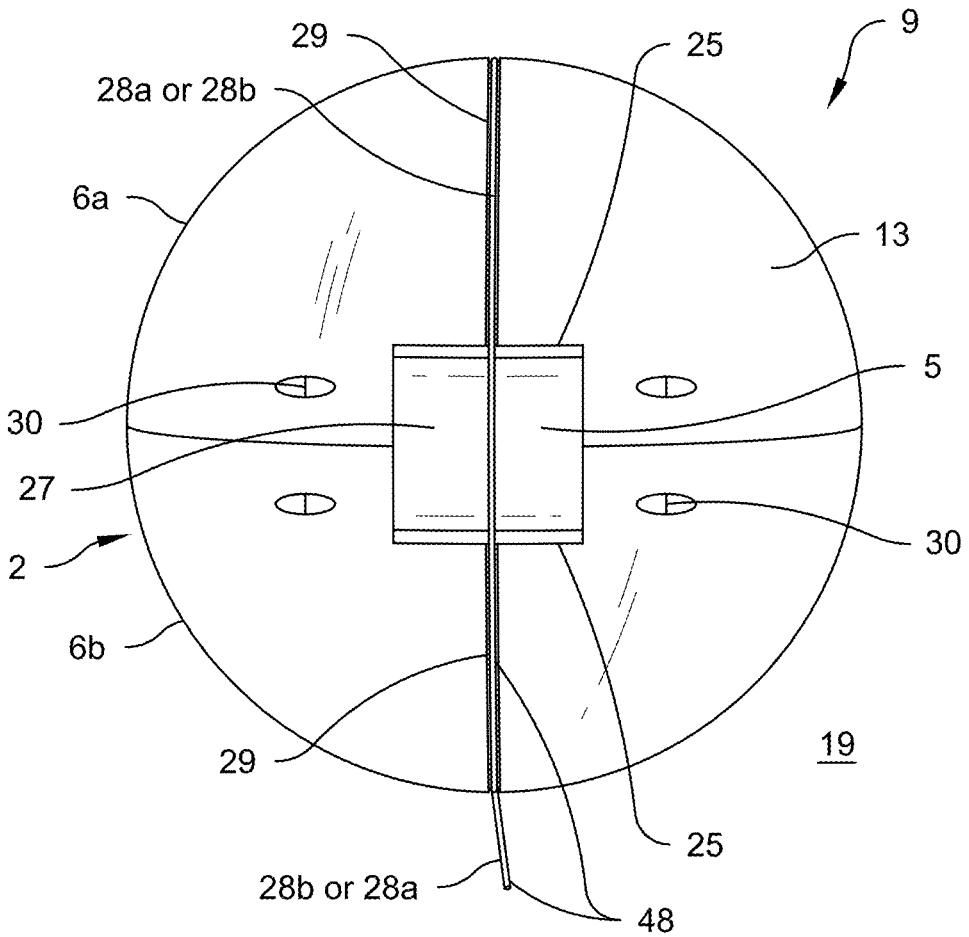
FIG. 3 is a side view illustrating a drone delivery system in a CLOSED configuration wherein a subpart of an upper part is hingedly attached to a lower part and a biasing mechanism is conformally disposed in a non-original shape along both upper and lower parts in accordance with an embodiment of the disclosure.

Referring now to FIGS. 1 and 3, the upper part 6a or a subpart 13 may be hingedly attached to the lower part 6b so that the respective components are movably separable, preferably in a rotatable fashion although other separation modes are possible. By way of one non-limiting example, the upper part 6a or the subpart 13 may be secured to the lower part 6b via a hinge mechanism 5. The hinge mechanism 5 may be a leaf-style hinge so as to include a leaf 27 secured at one end to the upper part 6a or a subpart 13 via a pin 30 and secured at another end to the lower part 6b via another pin 30. In some embodiments, the leaf 27 may extend into a notch 25 along each of the upper part 6a (or the subpart 13) and the lower part 6b so as to permit rotatable separation between the component parts of the housing 2. The pin 30 may be metal or other suitable material which properly secures the respective components in a rotatable fashion.

Referring again to FIGS. 1 and 3, the parts 6a, 6b, the subparts 13, and the leaf 27 may be fabricated from one or more impact-resistant materials which is/are non-rigid, semi-rigid, or rigid. Non-limiting examples of such materials include acrylonitrile butadiene styrene (ABS), carbon-fiber composite, polylactic acid (PLA), high-impact polystyrene (HIPS), polyethylene terephthalate glycol (PETG), nGen by ColorFabb B.V. in the Netherlands, rubber, or metal. In preferred embodiments, the parts 6a, 6b, the subparts 13, and the leaf 27 should be temperature resistant.

Referring now to FIGS. 1-4, the upper part 6a and the lower part 6b may be separable via a biasing mechanism 48. The biasing mechanism 48 may include one or more biasing elements 28 which reconfigure the housing 2 from a CLOSED configuration 9 to an OPEN configuration 11. When construction of the upper part 6a includes two or more subparts 13, a biasing element 28a, 28b may be preferred for each subpart 13. The biasing element 28 is adapted to move the upper part 6a or the subparts 13 with respect to the lower part 6b. In preferred embodiments, the biasing element 28 may be bendable or the like to a non-original shape and resilient so as to recover an original shape in part or whole. By way of non-limiting examples, the biasing element 28 could be a piano wire or a high-carbon steel wire which is bendable about the housing 2 in the CLOSED configuration

Figure 10:
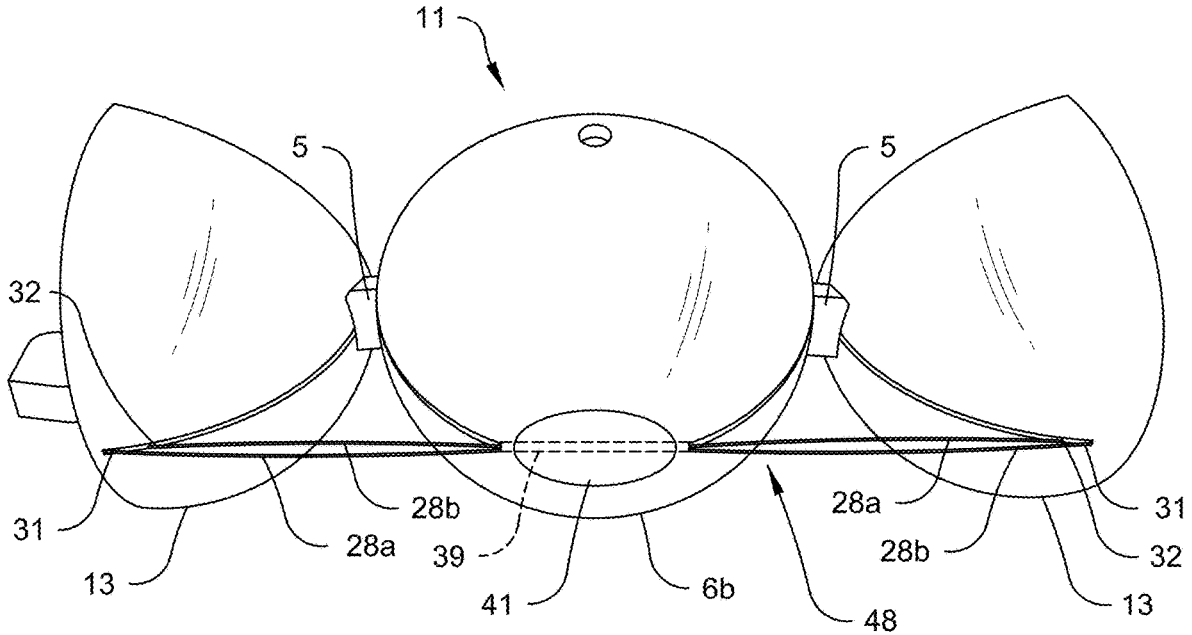
FIG. 10 is a perspective bottom view illustrating a housing in an OPEN configuration wherein a lower part is disposed between two subparts of an upper part and a biasing mechanism is separately attached to each of the subparts and passes through a channel traversing the lower part in accordance with an embodiment of the disclosure.

9 such as illustrated in FIGS. 1-4 and which prefers a linear shape such as in the OPEN configuration 11 in FIG. 10.

Figure 2:
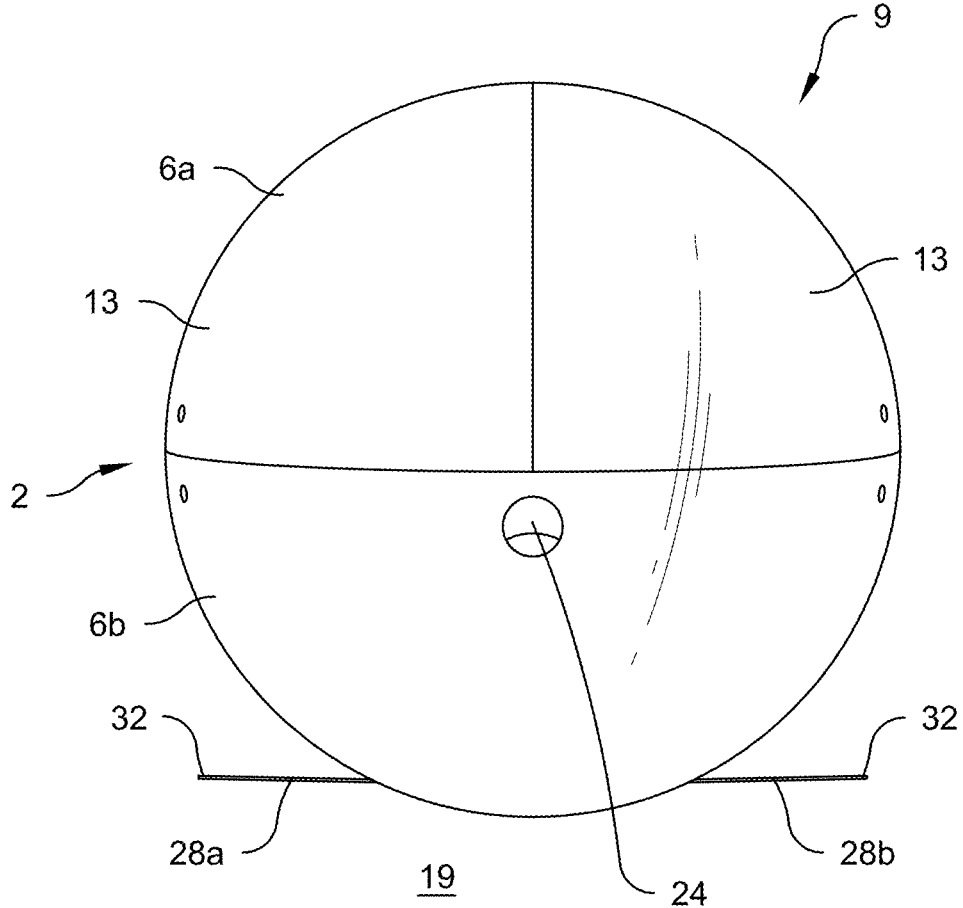
FIG. 2 is a front view illustrating a drone delivery system in a CLOSED configuration wherein a drone (not shown) is disposed within a housing including a pair of parts arranged so that one part includes two optional subparts which are movable with respect to the other part to form an OPEN configuration in accordance with an embodiment of the disclosure.
Figure 4:
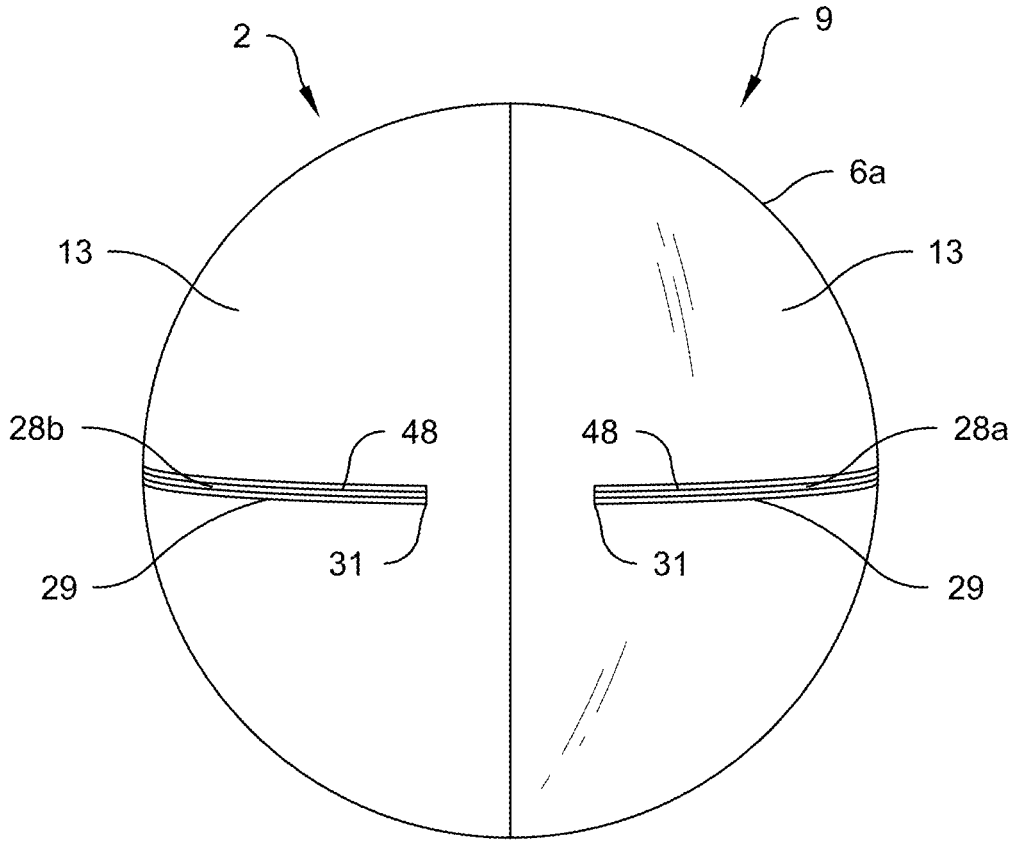
FIG. 4 is a top view illustrating a drone delivery system in a CLOSED configuration wherein one biasing element is attached at one end to a subpart and conformally disposed thereon and another biasing element is attached at one end to another subpart and conformally disposed thereon in accordance with an embodiment of the disclosure.

Referring again to FIGS. 1-4, a biasing element 28a or 28b may be attached to a subpart 13 (or a part 6a). A first end 31 of the biasing element 28a or 28b could be fixed to the subpart 13 such as illustrated in FIG. 4. In some embodiments, the first end 31 could be mechanically secured within a hole or opening along the housing 2. In other embodiments, the first end 31 could be adhesively secured to the exterior of the housing 2. The biasing element 28a or 28b may curvedly contact the exterior of the housing 2 such as illustrated in FIGS. 1, 3, and 4. In some embodiments, the biasing element 28a or 28b may reside within a groove 29 along one or both parts 6a, 6b and corresponding subparts 13 such as illustrated in FIGS. 1, 3, and 4. A second end 32 of the biasing element 28a or 28b may extend outward from the lower part 6b adjacent to a surface 19 such as illustrated in FIGS. 2 and 3. In preferred embodiments, the biasing element 28a or 28b may pass through a channel 39 at the lower part 6b such as illustrated in FIG. 10. The channel 39 may include a pair of holes through the lower part 6b or a continuous cavity through the wall of the lower part 6b. One or more biasing elements 28a, 28b may pass through and slidingly contact the channel 39. In some embodiments, the second ends 32 of two biasing elements 28a, 28b may extend in opposite directions outward from the housing 2 such as illustrated in FIG. 2. The second ends 32 may extend into and reside within the housing 2 in other embodiments.

The drone delivery system 1 may also include a housing 2 disposed about a drone 3 in the CLOSED configuration 9 and not disposed about a drone 3 in the OPEN configuration 11. The drone 3 is surrounded by the housing 2 in the CLOSED configuration 9 as in FIGS. 1-4 and not surrounded by the housing 2 in the OPEN configuration 11 as in FIGS. 5 and 7. The housing 3 may surround the drone 3 so as to completely or not completely enclose the drone 2.

Figure 5:
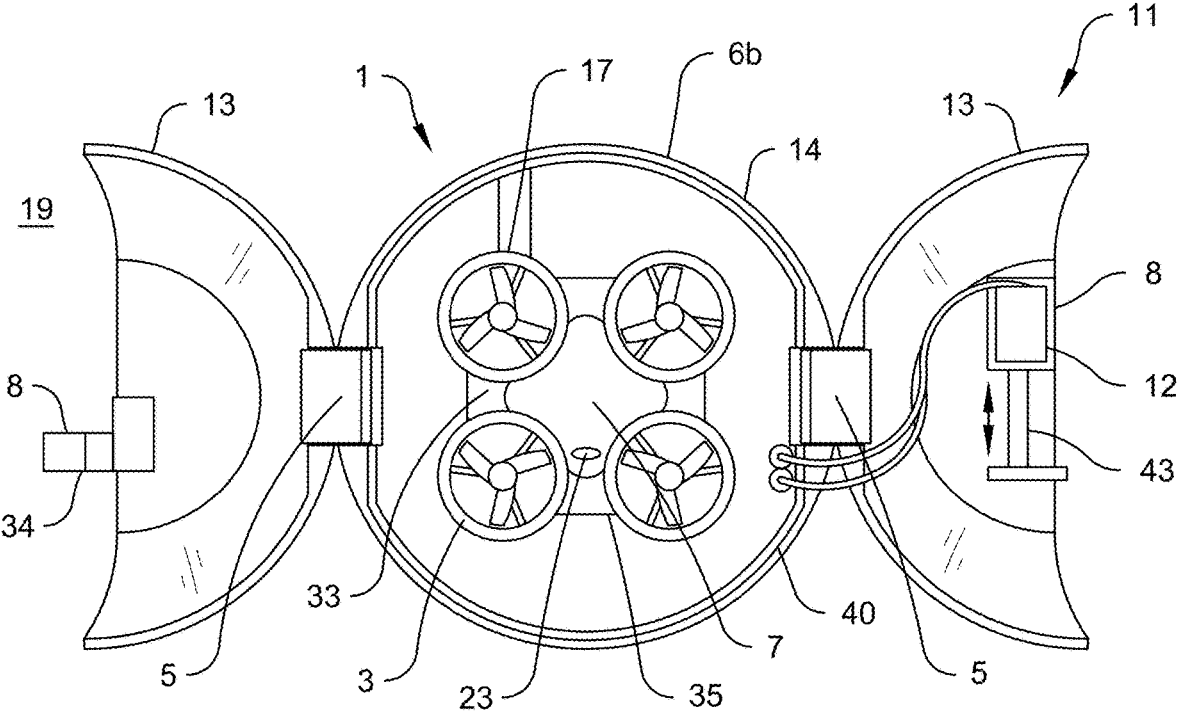
FIG. 5 is a top view illustrating a drone delivery system in an OPEN configuration wherein a drone contacts a lower part which is hingedly attached to and disposed between a pair of subparts releasably securable via a lock mechanism in accordance with an embodiment of the disclosure.

Referring now to FIG. 5, the lower part 6b may include a well 35 or other cavity-like structure. The drone 3 may be secure to the lower part 6b within the well 35 or to a well cover 33 over or within the well 35. In one non-limiting example, the drone 3 in part or whole may be pressed into the well 35 or other cavity within the lower part 6b which approximates the perimeter or a component of the drone 3. In another non-limiting example, the drone 3 could be mechanically secured to the lower part 6b via a clip or other fastener with release functionality. Regardless of the attachment design, it is understood that the drone 3 should be releasable from the lower part 6b in the OPEN configuration 11 to permit separation of the drone 3 from the drone delivery system 1. In preferred embodiments, separability is implemented by movement of the drone 3 with respect to the housing 2.

Referring again to FIG. 5, the drone 3 may be a remotely controllable device and/or an autonomous device which is movable from the drone delivery system 1 in the OPEN configuration 11. In some embodiments, the drone 3 may include one or more flight-enabling fans 17 so that the drone 3 separates from the lower part 6b via flight. One non-limiting example of a flight-enabled drone is the Beta65S available under the BETAFPV trademark owned by Shenzhen Baida Moxing Co., Ltd. in Shenzhen, China. In other embodiments, the drone 3 may separate from the lower part 6b without flight so as to contact and move along a surface 19 adjacent to the drone delivery system 1 in the OPEN configuration 11. The drone 3 may include one or more sensors 7 capable of gathering data (also sometimes referred to as information), examples including but not limited to sound, image, video, sample (such as detect presence or obtain portion of a solid, a liquid, or a gas), temperature, pressure, voltage, current, or radiation. In preferred embodiments, the sensor 7 could be in the form of a camera 23 which records a still image or a video with or without sound. The sensor 7 may be positioned within the housing 2 so as to align with the optional port 24 in FIG. 1 or 2 so as to gather information before separation of the drone 3 from the housing 2 or when the housing 2 fails to reconfigure to the OPEN configuration 11 or when the drone 3 fails to properly separate from the housing 2. In addition to or instead of facilitating information gathering, the optional port 24 may permit for passive thermal control by providing a pathway for air out of or into the housing 2 or active thermal control by providing a pathway for air moved by a fan or the like within the housing 2, a non-limiting example being a fan 17 attached to the drone 3.

Figure 6:
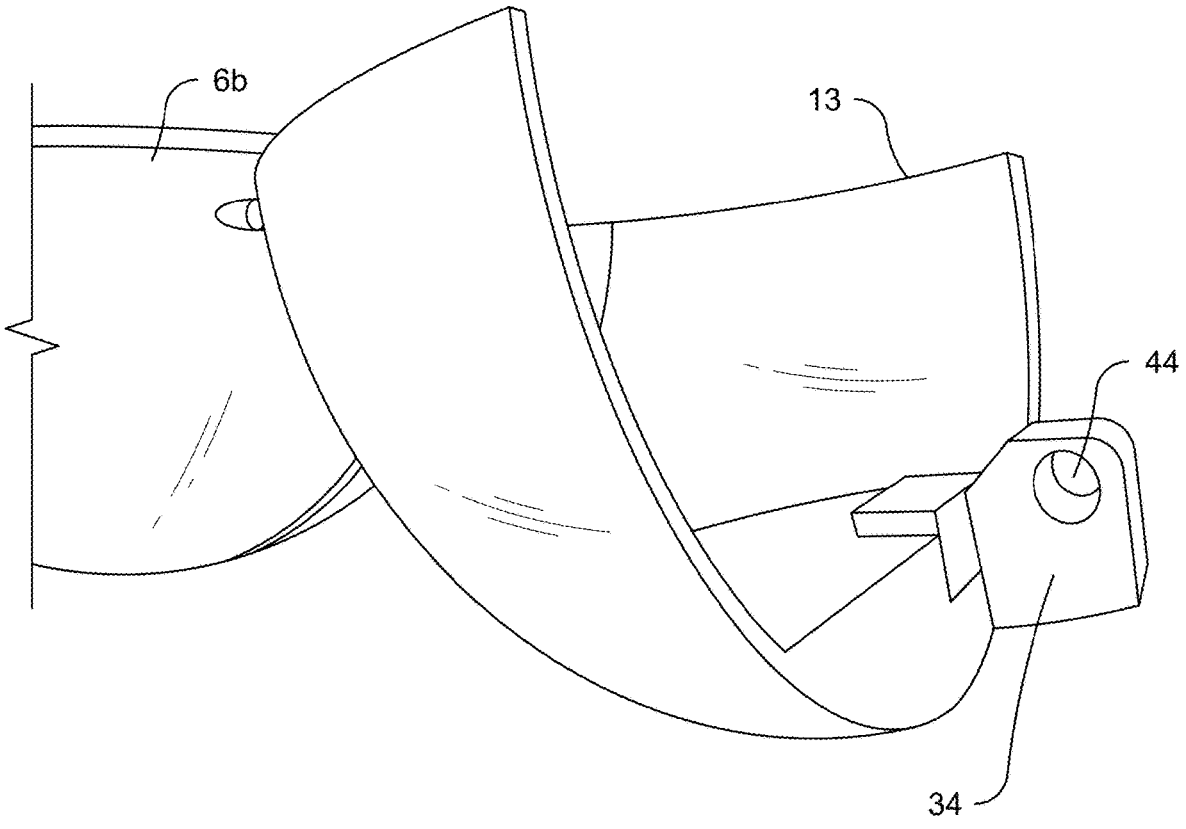
FIG. 6 is an enlarged perspective view illustrating a flange with slot for a lock mechanism which extends from one subpart in accordance with an embodiment of the disclosure.

Referring now to FIGS. 5 and 6, the lock mechanism 8 may releasably secure the subparts 13 or the parts 6 in the CLOSED configuration 9 and not secure the subparts 13 or the parts 6a, 6b in the OPEN configuration 11. The subparts 13 or an upper part 6a may engage a lip 40 along the open end 14 of the lower part 6b to prevent slippage between the upper part 6a or the subparts 13 thereof and the lower part 6b when locked in the CLOSED configuration 9. The lock mechanism 8 permits for a locked mode and an unlocked mode based on input from a timer 4 or a receiver 49. In preferred embodiments, the lock mechanism 8 may include an electro-mechanical device 12 capable of locking functionality to prevent separation of the subparts 13 or the parts 6a, 6b in the CLOSED configuration 9 via the biasing mechanism 48 and capable of unlocking functionality so that the subparts 13 or the parts 6a, 6b are separable in the OPEN configuration 11 via the biasing mechanism 48. A non-limiting example of a lock mechanism 8 is an electro-mechanical device 12, such as a solenoid, secured to one subpart 13 or part 6 which moves a pin 43 into and out of a slot 44 along a flange 34 extending from another subpart 13 or part 6. The lock mechanism 8 is locked when the pin 43 engages the slot 44 and unlocked when the pin 43 does not engage the slot 44. By way of one non-limiting example, a solenoid sold by UXCELL having a 5 mm stroke and rated for 12-volt DC and 1.1 amps was suitable for some embodiments. Another non-limiting example of a lock mechanism 8 is an electro-mechanical device 12 such as a servo with a pin, such as a pushrod, secured to one subpart 13 or part 6 which engages and disengages a slot or the like along another subpart 13 or part 6. Another non-limiting example of a lock mechanism 8 is an electro-mechanical device 12 such as a servo release mechanism secured to one subpart 13 or part 6 which engages and disengages suitable structure along another subpart 13 or part 6. Regardless of the specific design, the lock mechanism 8 is understood to include components which enable locking and unlocking between a pair of subparts 13 or a pair of parts 6 so that the housing 2 properly allows for both a CLOSED configuration 9 and an OPEN configuration 11.

Figure 7:
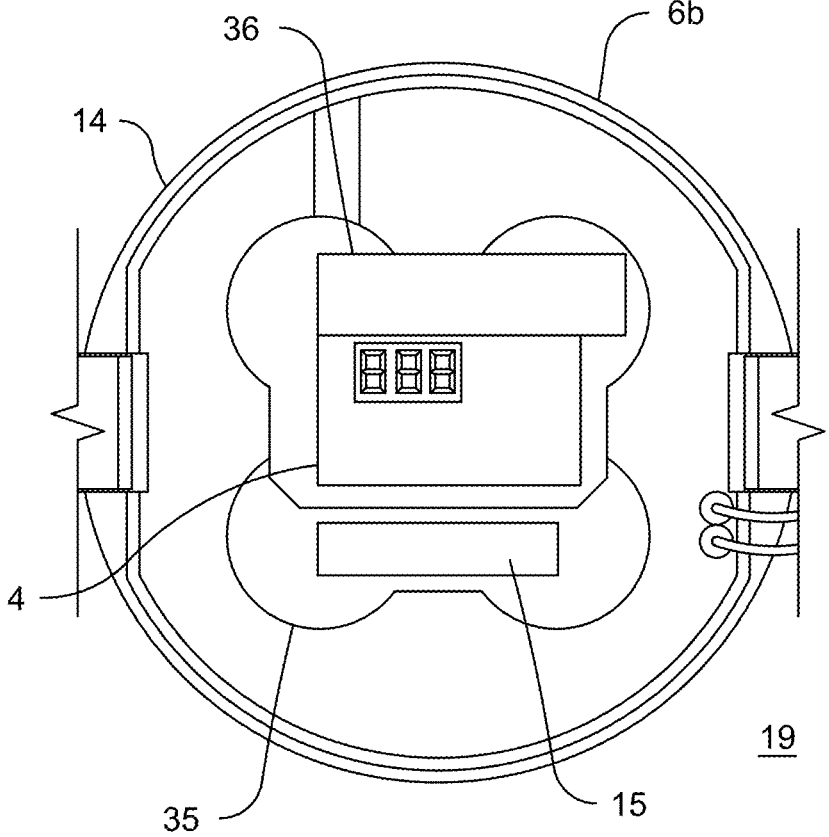
FIG. 7 is a top view illustrating a timer, a power supply, and an optional ballast disposed within a well within a lower part in accordance with an embodiment of the disclosure.

Referring now to FIG. 7, the timer 7 may be secured to the one of the parts 6, such as to the lower part 6b within the well 35, preferably under the drone 3 (not shown) and adjacent to a power supply 36 and an optional ballast 15. The timer 7 is generally understood to enable a time-based control for function of the lock mechanism 8. In preferred embodiments, the timer 7 electrically communicates with the electro-mechanical device 12 of the lock mechanism 8 to control power from the power supply 36 to the lock mechanism 8 which unlocks when the lock mechanism 8 is powered and locks when the lock mechanism 8 is not powered.

Figure 8:
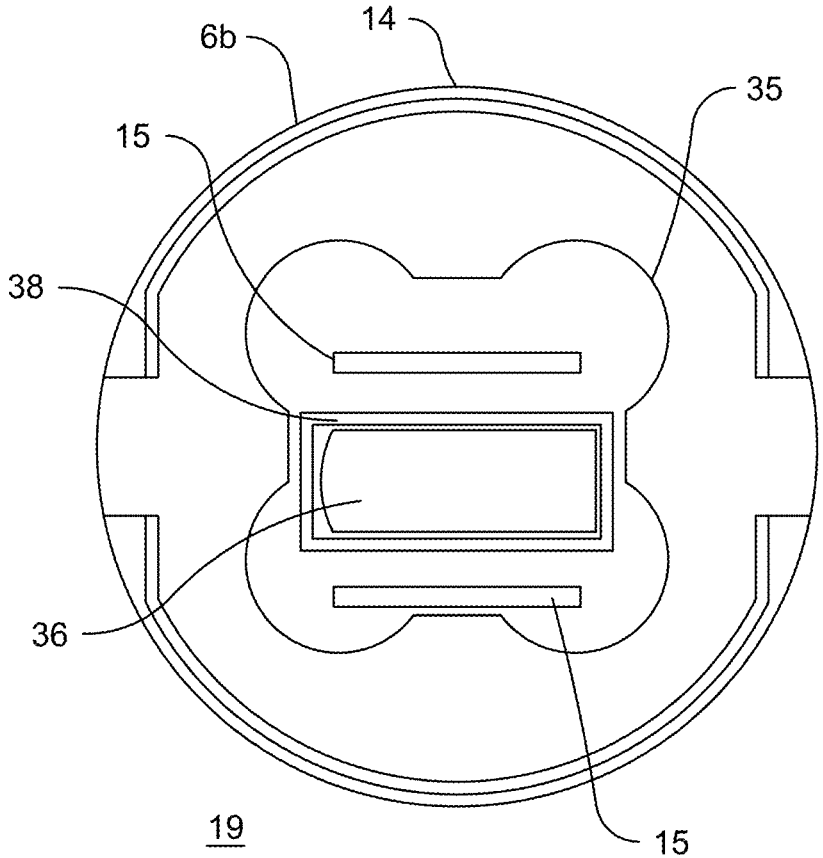
FIG. 8 is an enlarged perspective view illustrating a pocket within a well wherein a power supply is disposed within the pocket and optional ballast is disposed about the pocket in accordance with an embodiment of the disclosure.

Referring now to FIGS. 7 and 8, the power supply 36 with or without ballast 15 may be positioned within the well 35 or a pocket 38 within the well 35 so that the center-of-mass for the lower part 6b is biased away from the open end 14. This arrangement prefers an orientation whereby the lower end 14 of the housing 2 contacts a surface 19 when the drone delivery system 1 is at rest, such as generally illustrated in FIG. 1. Other approaches for establishing a preferred orientation by the drone delivery system 1 along a surface 19 are possible.

Figure 9A:
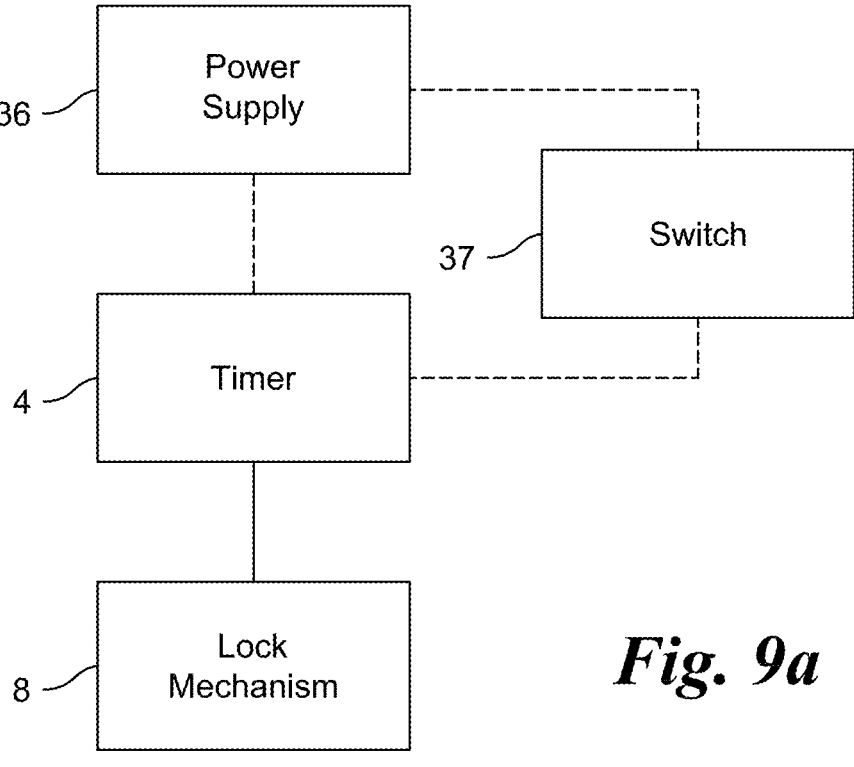
FIG. 9*a* is a block diagram illustrating several connective arrangements between a power supply, a timer, a lock mechanism, and an optional switch within a drone delivery system in accordance with an embodiment of the disclosure.

Referring now to FIG. 9a, the power supply 36 may directly electrically communicate with the timer 4 or indirectly electrically communicate with the timer 4 via a switch 37. The power supply 36 is a battery or the like, one non-limiting example of the former being a lithium-polymer battery available under the BETAFPV trademark owned by Shenzhen Baida Moxing Co., Ltd. in Shenzhen, China. The switch 37 may be any device capable of controlling power from the power supply 36 to the timer 4, non-limiting examples being mechanically or electrically implemented switching devices. In preferred embodiments, the timer 4 directly electrically communicates with the electro-mechanical device 12 of the lock mechanism 8. A non-limiting example of the timer 4 is the timer relay module sold under model no. JZ-802 by DZS Elec. In some embodiments, the lock mechanical 8 may be configured to lockingly secure the subparts 13 or the parts 6a, 6b prior to communicating power from the power supply 36 to a component(s) of the drone delivery system 1. In other embodiments, the electro-mechanical device 12 may be set to one of the locked or unlocked modes prior to communicating power from the power supply 36 to a component(s) of the drone delivery system 1.

Figure 9B:
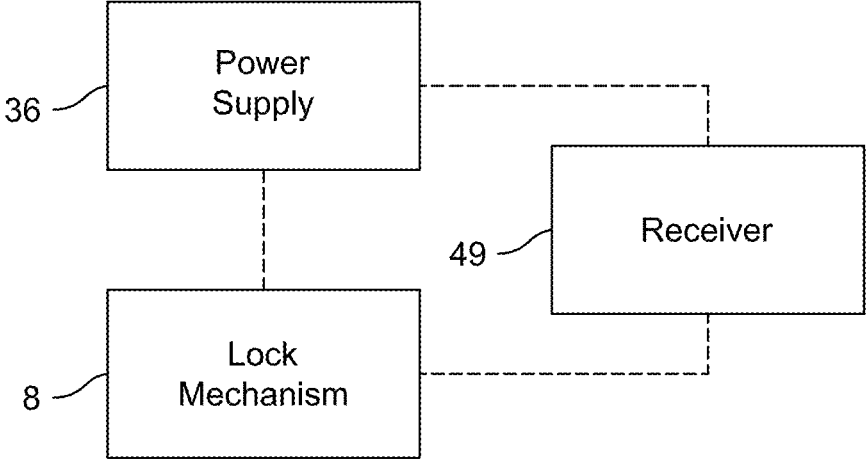
FIG. 9*b* is a block diagram illustrating several connective arrangements between a power supply, a receiver, and a lock mechanism in accordance with an embodiment of the disclosure.
Figure 12:
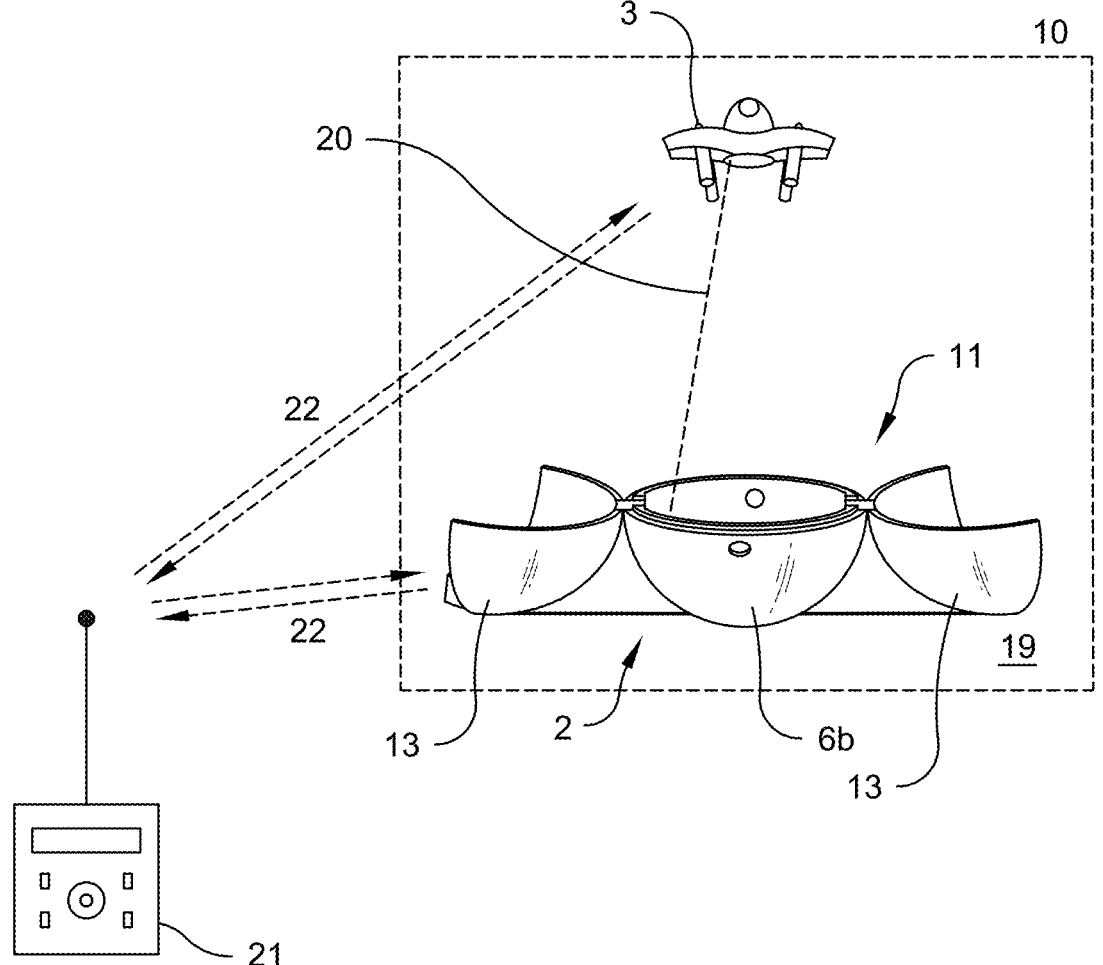
FIG. 12 is a schematic view illustrating a drone delivery system in an OPEN configuration after separation of a drone wherein an optional tether is attached between the drone and the housing and a controller is either directly communicable with the drone or indirectly communicable with the drone by way of a transmitter/receiver (not shown) within a housing in accordance with an embodiment of the disclosure.

Referring now to FIG. 9b, the lock mechanism 8 may directly electrically communicate with a power supply 36 and a receiver 49 in some embodiments or directly with a receiver 49 and indirectly with a power supply 36 in other embodiments. The power supply 36 is a battery or the like, one non-limiting example of the former being a lithium-polymer battery under the BETAFPV trademark owned by Shenzhen Baida Moxing Co., Ltd. in Shenzhen, China. The receiver 49 could be secured to one of the parts 6 as similarly described for the timer 4. The receiver 49 is any device capable of communication with a controller 21, that is capable of receiving signals from a controller 21 preferably via wireless means as generally illustrated in FIG. 12. In preferred embodiments, the receiver 49 may communicate with the electro-mechanical device 12 of the lock mechanism 8 so that the lock mechanism 8 enables selection of either a locked mode or an unlocked mode as required during use of the drone delivery system 1. When the power supply 36 directly powers the lock mechanism 8, the receiver 49 communicates signals to the lock mechanism 8 which enable the required mode. When the power supply 36 does not directly power the lock mechanism 8, the receiver 49 may control power to the lock mechanism 8 to enable the required mode.

Figure 11:
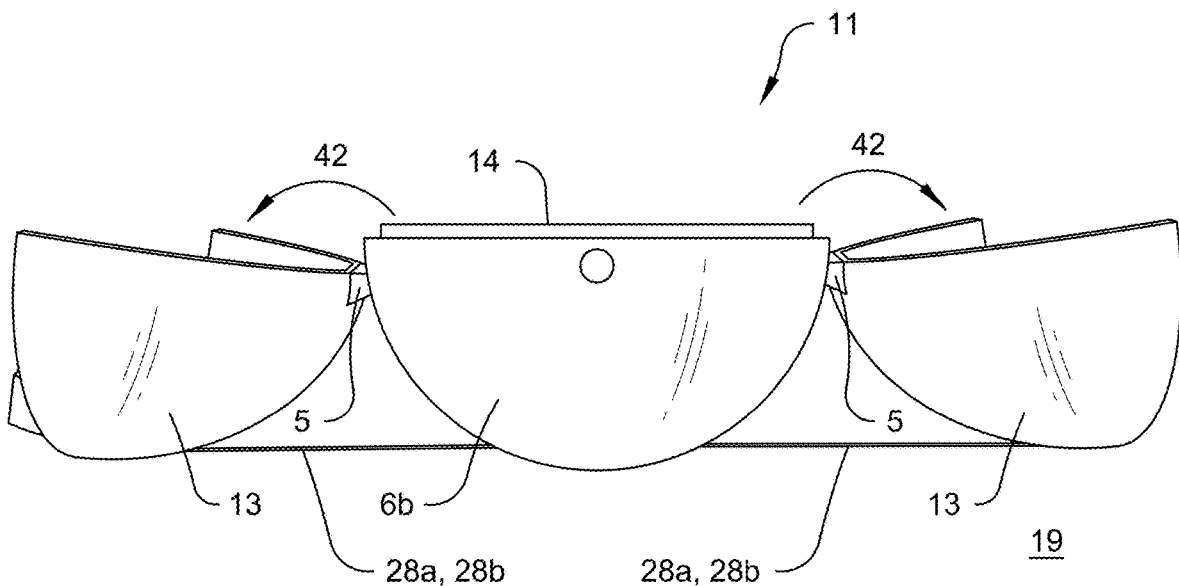
FIG. 11 is a front view illustrating a drone delivery system in an OPEN configuration along a surface wherein a lower part is disposed between a pair of subparts and a biasing mechanism is disposed in an original shape and traverses the lower part between the subparts in accordance with an embodiment of the disclosure.

Referring now to FIGS. 5, 10 and 11, the biasing mechanism 48 reconfigures the housing 2 from the CLOSED configuration 9 to the OPEN configuration 11 by separating the subparts 13 (or the parts 6) after the lock mechanism 8 is unlocked so that lower part 6b is oriented upward with the open end 14 directed away from the surface 19. In preferred embodiments, the lower part 6b is disposed between the subparts 13 (see FIG. 11) or next to the upper part 6a (see FIG. 16) in the OPEN configuration 11. The otherwise curved biasing elements 28a, 28b in the CLOSED configuration 9 return to a preferred shape, such as the non-limiting example shape in FIGS. 10 and 11, causing the subparts 13 (or the part 6a) to move in a bias direction 42 with respect to the lower part 6b as permitted by the hinge mechanism 5. The biasing elements 28a, 28b slidingly engage the channel 39 which allows the second end 32 of one biasing element 28a or 28b to move in the direction of the fixed first end 31 of another biasing element 28b or 28a. The extent of overlap between the two biasing elements 28a 28b at each side of the channel 39 is dependent on the length of the biasing element 28a, 28b which slidingly moves through the channel 39 to achieve the OPEN configuration 11. In some embodiments, it may be advantageous for the lower part 6b to include a contact surface 41 which is planar in part or whole so as to stabilize the lower part 6b in the OPEN configuration 11 along the surface 19. In preferred embodiments, motion of the subparts 13 or the parts 6 from the CLOSED configuration 9 to the OPEN configuration 11 could properly orient the open end 14 with respect to the surface 19 so that the drone 3 is separable from the lower part 6b without obstruction.

Referring now to FIG. 12, the drone 3 is separate from the housing 2 in the OPEN configuration 11 within an area of interest 10. The area of interest 10 could be any area, regardless of location, within which information may be obtained via a sensor. It may be advantageous during some applications for the drone 3 to be attached to a subpart 13 (or upper part 6b) or the lower part 6b via a tether 20. The tether 20 may limit travel of the drone 3 with respect to the housing 2. In some embodiments, the tether 20 may facilitate communication of either power or command(s) from a component(s) within the housing 2 to the drone 3. In other embodiments, the tether 20 may facilitate communication of data from the drone 3 to a component(s) within the housing 2. The drone 3 and/or the housing 2 may include transmitter and/or receiver component(s) which permit wireless communication 22 with a controller 21. In yet other embodiments, the housing 2 may be visually coded, non-limiting examples include color, shape, or marking which identifies a functional capability of the drone 3 and/or permits for proper synchronization between the drone 3 and the controller 21. In preferred embodiments, the controller 21 is a device which controls motion and other functions of the drone 3. The controller 21 for the drone 3 may control other functions of the drone delivery system 1; however, such other functions may be implemented via one or more other devices separate from the controller 21 for the drone 3.

Referring again to FIG. 12, the drone 3 in some applications may communicate a signal not receivable by a receiver, such as a controller 21 or other device, operable by a user and/or at a command post because of obstacles within the line-of-sight or because of power limitations by the drone 3. As such, it might be advantageous to include a receiver element at the housing 2 which is communicable with a transmitter element at the housing 2. The receiver element at the housing 2 could receive a signal from the drone 3 via the tether 20 or wirelessly. The receiver element at the housing 2 would function as a relay between the transmitter element at the drone 3 and a transmitter element at the housing 2 so that the signal is properly communicated by the drone 3 to a user and/or a command post. The signal from the drone 3 and by way of the transmitter element at the housing 2 may be communicated on different channels so that a user and/or a command post receives the signal on the same device or separate devices whereby the signal from the drone 3 is communicated at one frequency at a lower power and the signal from the housing 2 is communicated at another frequency at a higher power as amplified by electronics at the housing 2. Indirect communication between the drone 3 and a viewer via the housing 2 may be particularly beneficial to video data, however, not limited to this data type.

Figure 13:
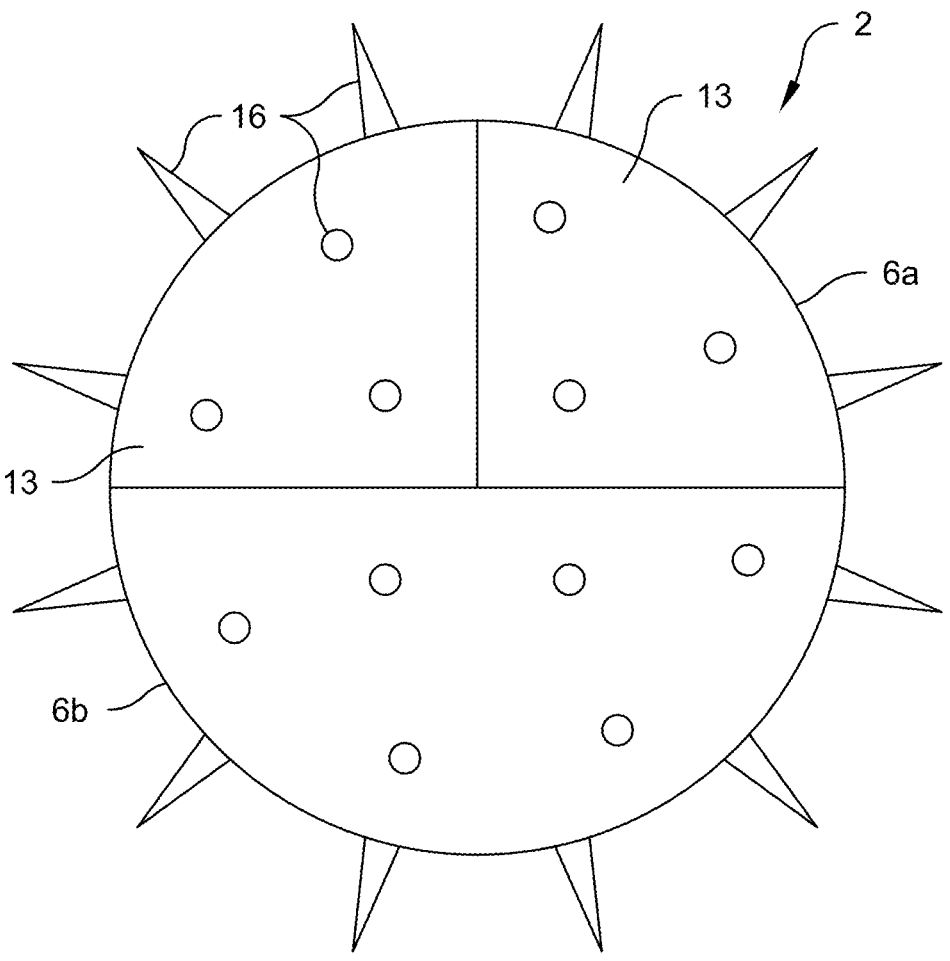
FIG. 13 is a front view illustrating a drone delivery system in a CLOSED configuration wherein a plurality of protrusions outwardly extends from a housing in accordance with an embodiment of the disclosure.

Referring now to FIG. 13, it may be advantageous in some embodiments to include one or more protrusions 16 which extend generally outward from a subpart 13 or a part 6a, 6b. In some embodiments, the protrusion(s) 16 could be a feature of the housing 2. In other embodiments, the protrusion(s) 16 could be an element secured to the housing 2 via mechanical, adhesive, or other suitable means. In preferred embodiments, the protrusion(s) 16 is shaped and/or composed of a material, non-limiting examples of the latter being a metal or ceramic, which permit(s) the drone delivery system 1 to penetrate or to traverse an obstacle that might otherwise prevent delivery to an area of interest 10.

Figure 14A:
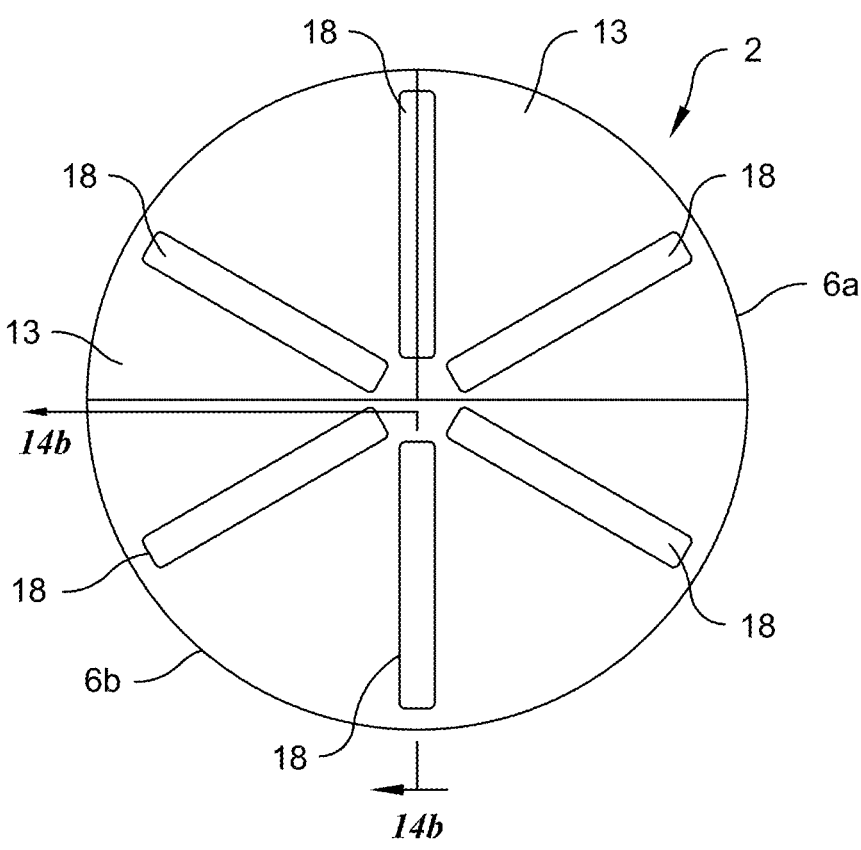
FIG. 14*a* is a front view illustrating a drone delivery system in a CLOSED configuration wherein a plurality of coverings is disposed along an exterior of a housing in accordance with an embodiment of the disclosure.
Figure 14B:
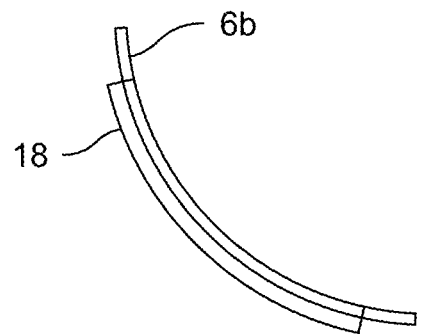
FIG. 14*b* is a cross section view illustrating the outwardly extending covering disposed along the exterior of the housing in accordance with an embodiment of the disclosure.

Referring now to FIGS. 14a and 14b, it may be advantageous in some other embodiments to include one or more coverings 18 along the exterior surface of a subpart 13 or a part 6a, 6b. The covering(s) 18 may extend outward from the housing 2 as illustrated in FIG. 14b or could be flush mounted to the housing 2. The covering(s) 18 may be constructed or one or more materials, non-limiting examples including a sandpaper-like layer, a rubber or a foam. A covering 18 may include texture or other feature which enhances grip of the housing 2 by a user or which enhances flight mobility by the housing 2 when launched or thrown or which enhances rolling mobility by the housing 2 along a surface 19. In other embodiments, the covering(s) 18 could include properties, one non-limiting example being compression, or features which mitigate shock transmitted to components within the housing 2 or which mitigate noise external to the housing 2 resulting when the drone delivery system 1 impacts an obstacle or lands on a surface 19.

Figure 15A:
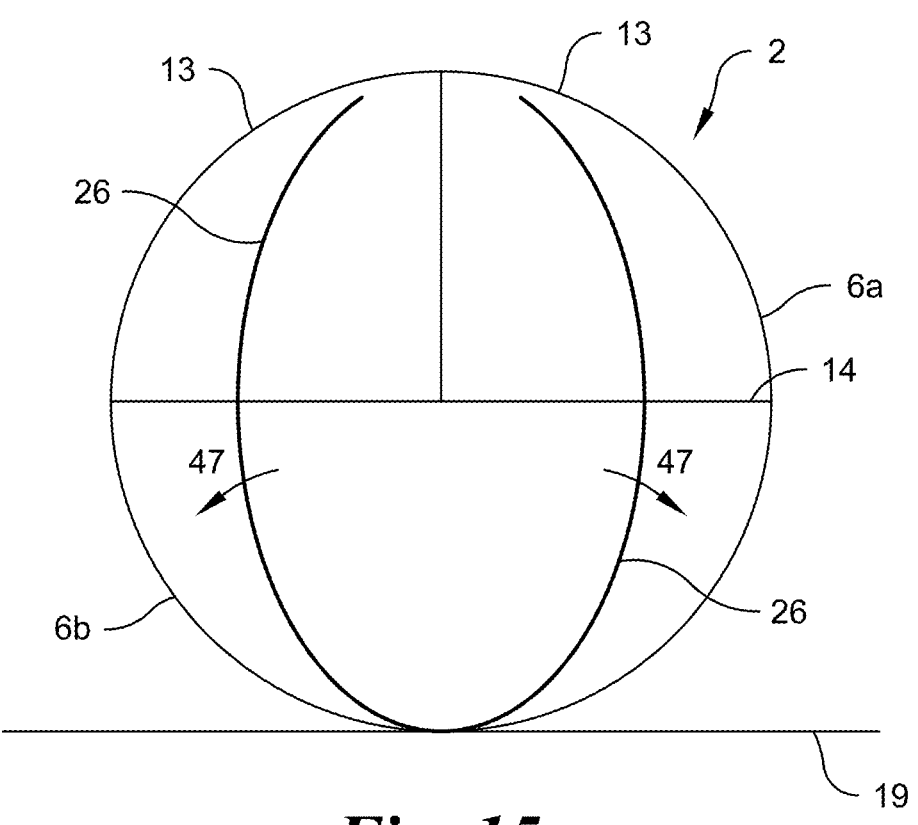
FIG. 15*a* is a front view illustrating a drone delivery system in a CLOSED configuration with a plurality of arms curvedly disposed along an exterior of a housing in accordance with an embodiment of the disclosure.
Figure 15B:
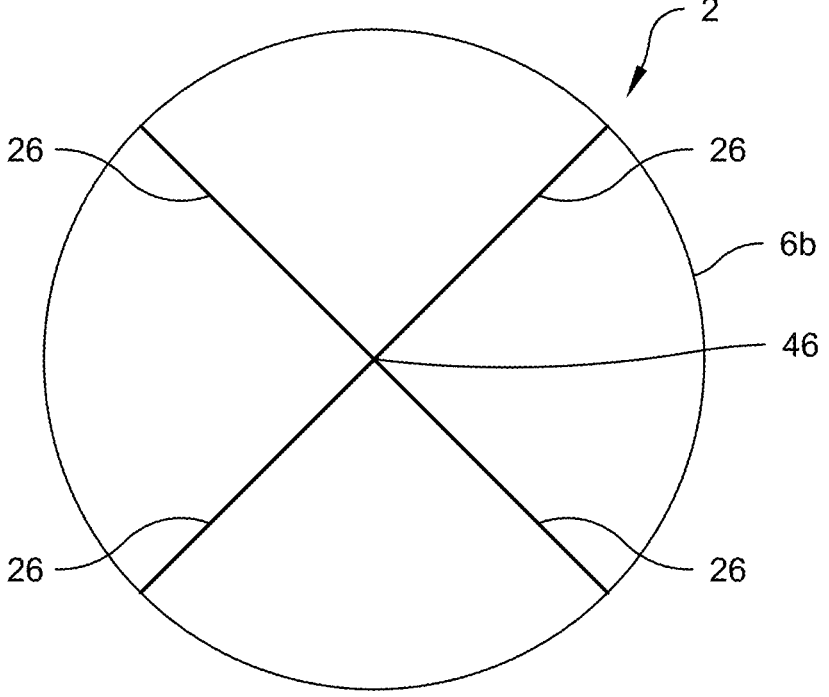
FIG. 15*b* is a bottom view illustrating curved arrangement of arms along the exterior of the housing prior to release wherein fixed ends of the arms are secured at the lower end of the lower part in accordance with an embodiment of the disclosure.
Figure 15C:
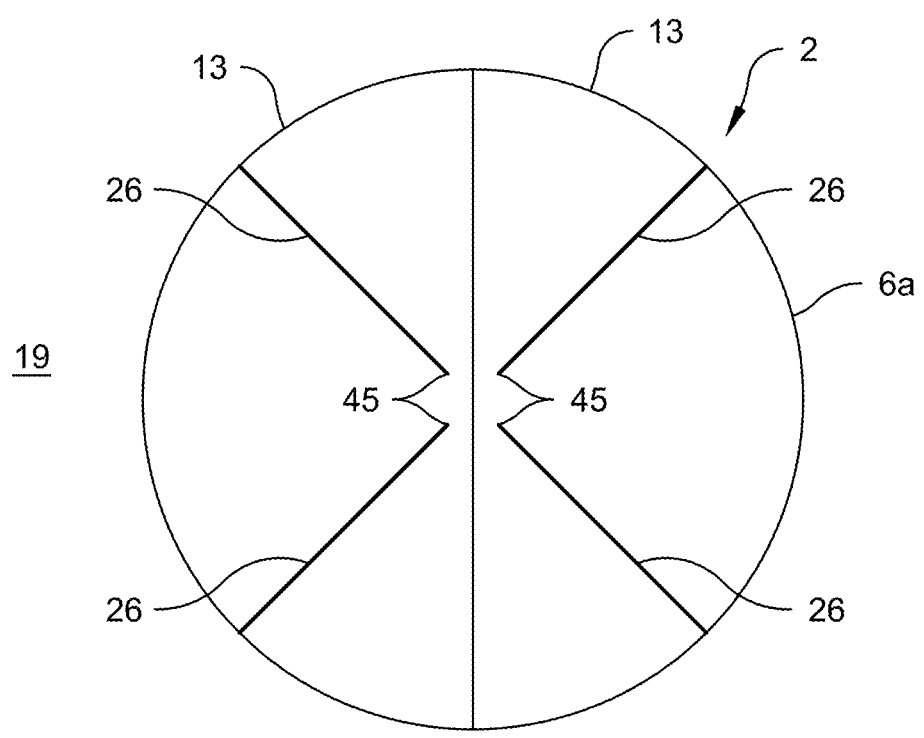
FIG. 15*c* is a top view illustrating curved arrangement of arms along the exterior of the housing prior to release wherein a free end of each arm is releasably secured adjacent to the upper end of the upper part in accordance with an embodiment of the disclosure.
Figure 15D:
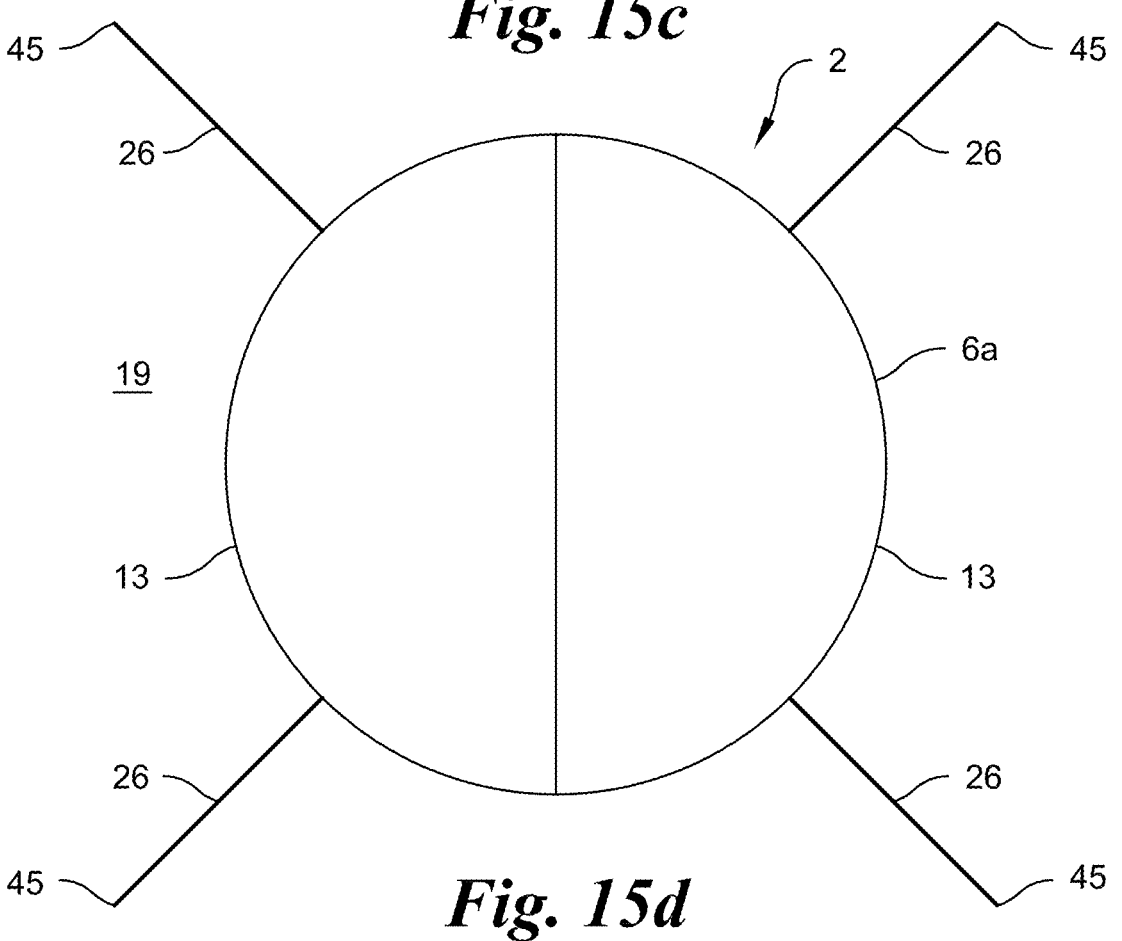
FIG. 15*d* is a top view illustrating arrangement of arms after release from the housing wherein each arm is disposed along a surface adjacent to the lower part so as to orient the housing in a preferred direction, such as in FIG. 15*a*, in accordance with an embodiment of the disclosure.

Referring now to FIGS. 15a-15d, it may be advantageous in yet other embodiments to include functionality which orients the open end 14 of the lower part 6b away from a surface 19 such as generally illustrated in FIG. 11. In one non-limiting example, a plurality of arms 26 could be releasably secured about and extendable from the housing 2. The arms 26 are adapted to permit proper orientation of the housing 2 along the surface 19, such as by way of the non-limiting example in the following. The arms 26 curvedly conform to the exterior surface of the housing 2 such as in FIG. 15a. A fixed end 46 of each arm 26 could be secured, via mechanical, adhesive or other means, at a lower end of the lower part 6b such as in FIG. 15b. The free end 45 of each arm 26 could be disposed toward the top end of the upper part 6a such as in FIG. 15c. The arms 26 could be released from a stowed position of the CLOSED configuration 9 so as to extend outward and contact the surface 19 prior to, during or after reconfiguration to the OPEN configuration 11 such as generally illustrated in FIG. 15d. In non-limiting examples, the arm 26 may be a piano wire or a high-carbon steel wire which is bendable about the housing 2 in the CLOSED configuration 9 and which prefers a shape in the OPEN configuration 11 to enable orientation of the housing 2 with respect to a surface 19. In some embodiments, the free end 45 of each arm 26 could be adhesively secured to the upper part 6a so that the arms 26 separate and move in a release direction 47 with respect to the housing 2 as the subparts 13 or the parts 6 are separated via the biasing mechanism 48.

Referring now to FIG. 16, the drone delivery system 1 described herein may include an upper part 6a without subparts 13 and a lower part 6*b*. The parts 6*a*, 6*b* could be attached via a hinge mechanism 5 which permits rotation between the parts 6*a*, 6*b*. The hinge mechanism 5 may be directly secured between the parts 6*a*, 6*b*. A drone 3, a timer 4 or a receiver 49, and a power supply 36 could be secured to a part 6. The parts 6*a*, 6*b* could be releasably secured via a lock mechanism 8, such as an electro-mechanical device 12 with movable pin 43 and a flange 34 with slot 44, which permits a biasing mechanism 48 (not shown) to reconfigure the parts 6 from a CLOSED configure 9 (see FIG. 1) to the OPEN configuration 11 in FIG. 16. The biasing mechanism 48 may include at least one biasing element 28 fixed to one part 6 and slidably disposed with respect to another part 6. Components, features, and options described with reference to FIGS. 1-15 and other parts of the disclosure are likewise applicable to the embodiments illustrated in FIG. 16. Components, features, and options described with reference to FIG. 16 and other parts of the disclosure are likewise applicable to the embodiments illustrated in FIGS. 1-15.

Referring now to FIGS. 1-16, the various embodiments of the drone delivery system 1 may be adapted to permit acceleration of the housing 2 in the CLOSED configuration 9 in the direction of the area of interest 10, actuation of the lock mechanism 8, separation of one subpart 13 from another subpart 13 or one part 6 from another part 6 to reconfigure the housing 2 from the CLOSED configuration 9 to the OPEN configuration 11, launch of the drone 3 from the housing 2 in the OPEN configuration 11, and obtention of data from a sensor 7 attached to the drone 3. The parts 6, which may include optional subparts 13, form the housing 2 about the drone 3 in the CLOSED configuration 9. The drone 3 resides within a cavity of the housing 2.

Acceleration of the housing 2 may be implemented by imparting kinetic energy to the drone delivery system 1 via a source not the user or by imparting kinetic energy to the drone delivery system 1 via a source which is the user. Acceleration should be sufficient in magnitude and/or duration to ensure the drone delivery system 1 is placed near to or into an area of interest 10.

Actuation of the lock mechanism 8 may be implemented by the timer 4 when directly communicable with the lock mechanism 8 whereby the timer 4 enables function of the lock mechanism 8 after a delay, typically time. The time delay is often preferred to be sufficient to permit completion of acceleration and arrival of the drone delivery system 1 into or near, that is closer than the user to, the area of interest 10 with or without contact between the drone delivery system 1 and the surface 19. The time delay is initiated when the user electrically attaches the power supply 36 to the timer 4 or the user operates the switch 37 to permit power from the power supply 36 to the timer 4. The actuation may be implemented via the controller 21 whereby the user operates the controller 21 to send command signals to a receiver 49 communicable with either the power supply 36 or the timer 4. The countdown function of the timer 4 may start when the timer 4 is initiated or thereafter when power is communicated to the timer 4, or via a command signal from the controller 21, or via the switch 37, or via other suitable means. Prior to acceleration, the lock mechanism 8 may be operable in part or whole to permit the user to open and close the housing 2. This feature is beneficial when preparing the drone delivery system 1 for use.

Actuation of the lock mechanism 8 may be implemented via the receiver 49 instead of or in addition to the timer 4. The receiver 49 is communicable with the controller 21 and electrically communicable with lock mechanism 8 whereby the user operates the controller 21 to send command signals to the receiver 49 which permits power from the power supply 36 to the lock mechanism 8 or which sends command signals directly to the lock mechanism 8. The receiver 49 may be directly integrated into or separate from the lock mechanism 8. Actuation may occur without a delay or with a delay implemented by the controller 21. Separation of the subparts 13 or the parts 6 may be implemented by the biasing mechanism 48 wherein one subpart 13 is moved away another subpart 13 or one part 6 is moved away from another part 6. Subparts 13 are moved away respectively when the subparts 13 no longer form the original shape of a part 6 or the housing 2 in the CLOSED configuration 9. Parts 6 are moved away respectively, preferably by rotation, so that the parts 6 no longer form the original shape of the housing 2 in the CLOSED configuration 9.

Movement of the drone 3 may be implemented via any means consistent with a locomotion mode(s) of the drone 3 and as permitted by the drone delivery system 1. The drone 3 may be capable of flight comparable to a helicopter or a plane so as to separate from the housing 2 in an aerial mode. The drone 3 may be capable of motion along a surface 19 comparable to a ground-based vehicle. The drone 3 may be capable of motion along a surface 19 of a liquid comparable to a watercraft. Movement may be initiated and controlled by the user via the controller 21 whereby the controller 21 directly sends command(s) to, with or without receiving signals from, the drone 3 or whereby the controller 21 indirectly sends command(s) to, with or without receiving signals from, the drone 3 via a communicates device along the housing 2.

Obtention of data may be implemented via any means whereby one of sound, image, video, sample, temperature, pressure, voltage, current, or radiation is acquired, such as but not limited to measured, recorded, detected, determined, sensed, sampled, gathered, indicated, or responded to, by the sensor 7. Data may be communicated either directly from the drone 3 or indirectly by way of the housing 2 via a transmitter unit at the housing 2. Obtention functionality may be implemented, such as but not limited to initiated, controlled, relayed, recorded and/or reviewed, by the user via the controller 21.

While the disclosure is susceptible to various modifications and alternative constructions, certain illustrative embodiments are shown in the drawings and are described in detail herein. It should be understood, however, there is no intention to limit the disclosure to the specific embodiments disclosed, but on the contrary, the intention is to cover all modifications, alternative constructions, combinations, and equivalents falling into the spirit and scope of the disclosure.

As is evident from the explanation herein, the disclosure in its various embodiments is applicable, but not limited, to gathering information from one location by a user/operator/pilot situated at another location.

What is claimed is:

1. A method of use for a drone delivery system comprising the steps of:
   (a) accelerating a housing in a CLOSED configuration, said housing includes a pair of parts disposed about a drone, one said part includes a pair of subparts, said housing surrounds said drone in said CLOSED configuration;
   (b) unlocking a lock mechanism to release one said subpart from other said subpart, said lock mechanism locked before said unlocking step;
   (c) separating said subparts via a biasing mechanism after said unlocking step so that said housing is in an OPEN configuration, said housing not surrounding said drone in said OPEN configuration;

(d) separating said drone from said housing in said OPEN configuration; and (e) obtaining a data via a sensor secured to said drone.

2. The method of claim 1, wherein said accelerating step implemented by launching.

3. The method of claim 1, wherein said accelerating step implemented by throwing.

4. The method of claim 1, wherein said accelerating step implemented by rolling.

5. The method of claim 1, wherein said unlocking step initiated via a timer at said housing and communicable with said lock mechanism.

6. The method of claim 1, wherein said unlocking step initiated after a delay.

7. The method of claim 1, wherein said unlocking step initiated via a controller directly communicable with said lock mechanism.

8. The method of claim 1, wherein said unlocking step initiated via a controller communicable with a receiver at said housing, said receiver communicable with said lock mechanism.

9. The method of claim 1, wherein said drone is an autonomous device.

10. The method of claim 1, wherein said drone is a remotely controlled device.

11. A method of use for a drone delivery system comprising the steps of:

(a) accelerating a housing in a CLOSED configuration, said housing includes a pair of parts disposed about a drone, each said part without subparts, said housing surrounds said drone in said CLOSED configuration;

(b) unlocking a lock mechanism to release one said part from other said part, said lock mechanism locked before said unlocking step;

(c) separating said parts via a biasing mechanism after said unlocking step so that said housing is in an OPEN configuration with one said part at one side of other said part, said housing not surrounding said drone in said OPEN configuration;

(d) separating said drone from said housing in said OPEN configuration; and (e) obtaining a data via a sensor secured to said drone.

12. The method of claim 11, wherein said accelerating step implemented by launching.

13. The method of claim 11, wherein said accelerating step implemented by throwing.

14. The method of claim 11, wherein said accelerating step implemented by rolling.

15. The method of claim 11, wherein said unlocking step initiated via a timer at said housing and communicable with said lock mechanism.

16. The method of claim 11, wherein said unlocking step initiated after a delay.

17. The method of claim 11, wherein said unlocking step initiated via a controller directly communicable with said lock mechanism.

18. The method of claim 11, wherein said unlocking step initiated via a controller communicable with a receiver at said housing, said receiver communicable with said lock mechanism.

19. The method of claim 11, wherein said drone is an autonomous device.

20. The method of claim 11, wherein said drone is a remotely controlled device.

* * * * *